US012561767B2

(12) United States Patent
Chen et al.

(10) Patent No.: US 12,561,767 B2
(45) Date of Patent: Feb. 24, 2026

(54) PARAMETER PROCESSING METHOD AND APPARATUS FOR VIRTUAL CAMERA, DEVICE, STORAGE MEDIUM, AND PROGRAM PRODUCT

(71) Applicant: TENCENT TECHNOLOGY (SHENZHEN) COMPANY LIMITED, Guangdong (CN)

(72) Inventors: Fasheng Chen, Guangdong (CN); Liang Zeng, Guangdong (CN); Lei Sun, Guangdong (CN); Zhiyang Lin, Guangdong (CN); Huizhi Zhou, Guangdong (CN); Xiangguang Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 231 days.

(21) Appl. No.: 18/437,426

(22) Filed: Feb. 9, 2024

(65) Prior Publication Data

US 2024/0185399 A1 Jun. 6, 2024

Related U.S. Application Data

(63) Continuation of application No. PCT/CN2023/114226, filed on Aug. 22, 2023.

(30) Foreign Application Priority Data

Sep. 5, 2022 (CN) .......................... 202211095639.3

(51) Int. Cl.
*G06T 5/70* (2024.01)
*G06T 7/80* (2017.01)
*G06T 11/00* (2006.01)

(52) U.S. Cl.
CPC .................. *G06T 5/70* (2024.01); *G06T 7/80* (2017.01); *G06T 11/00* (2013.01); *G06T 2207/30241* (2013.01); *G06T 2207/30244* (2013.01)

(58) Field of Classification Search
None
See application file for complete search history.

(56) References Cited

U.S. PATENT DOCUMENTS 11,250,617 B1 * 2/2022 Sempe ................... H04L 65/611
2017/0039756 A1 * 2/2017 Moule ..................... G06T 7/521
(Continued)

FOREIGN PATENT DOCUMENTS

WO WO-2022151864 A1 * 7/2022 ........... G06F 3/0481

*Primary Examiner* — James A Thompson
(74) *Attorney, Agent, or Firm* — Sughrue Mion, PLLC

(57) ABSTRACT

A parameter processing method and apparatus for a virtual camera. The method includes obtaining a camera parameter of a first virtual camera in a virtual scene, the first virtual camera having a binding relationship with a physical camera in a real scene and the physical camera being configured to obtain image data of an object in the real scene, smoothing the camera parameter of the first virtual camera to obtain a target camera parameter; and configuring a second virtual camera in the virtual scene and adjusting a camera parameter of the second virtual camera based on the target camera parameter to obtain an adjusted second virtual camera, a focus of the second virtual camera corresponding to a focus of the first virtual camera, wherein the adjusted second virtual camera is configured for rendering based on the image data to obtain an image of the virtual scene comprising the object.

20 Claims, 9 Drawing Sheets

(56)     References Cited

U.S. PATENT DOCUMENTS

| | | | |
|---|---|---|---|
| 2020/0074266 A1* | 3/2020 | Peake | G06F 18/2411 |
| 2021/0074023 A1* | 3/2021 | Williams | G06T 15/20 |
| 2023/0186434 A1* | 6/2023 | Thurston, III | G06T 7/90 |
| | | | 345/419 |
| 2023/0360337 A1* | 11/2023 | Xu | G06V 10/24 |

* cited by examiner

40

41

A server obtains a camera parameter of a first virtual camera in a virtual scene ⌐101

Smooth the camera parameter of the first virtual camera to obtain a target camera parameter ⌐102

Adjust a camera parameter of a second virtual camera in the virtual scene based on the target camera parameter to obtain the adjusted second virtual camera ⌐103

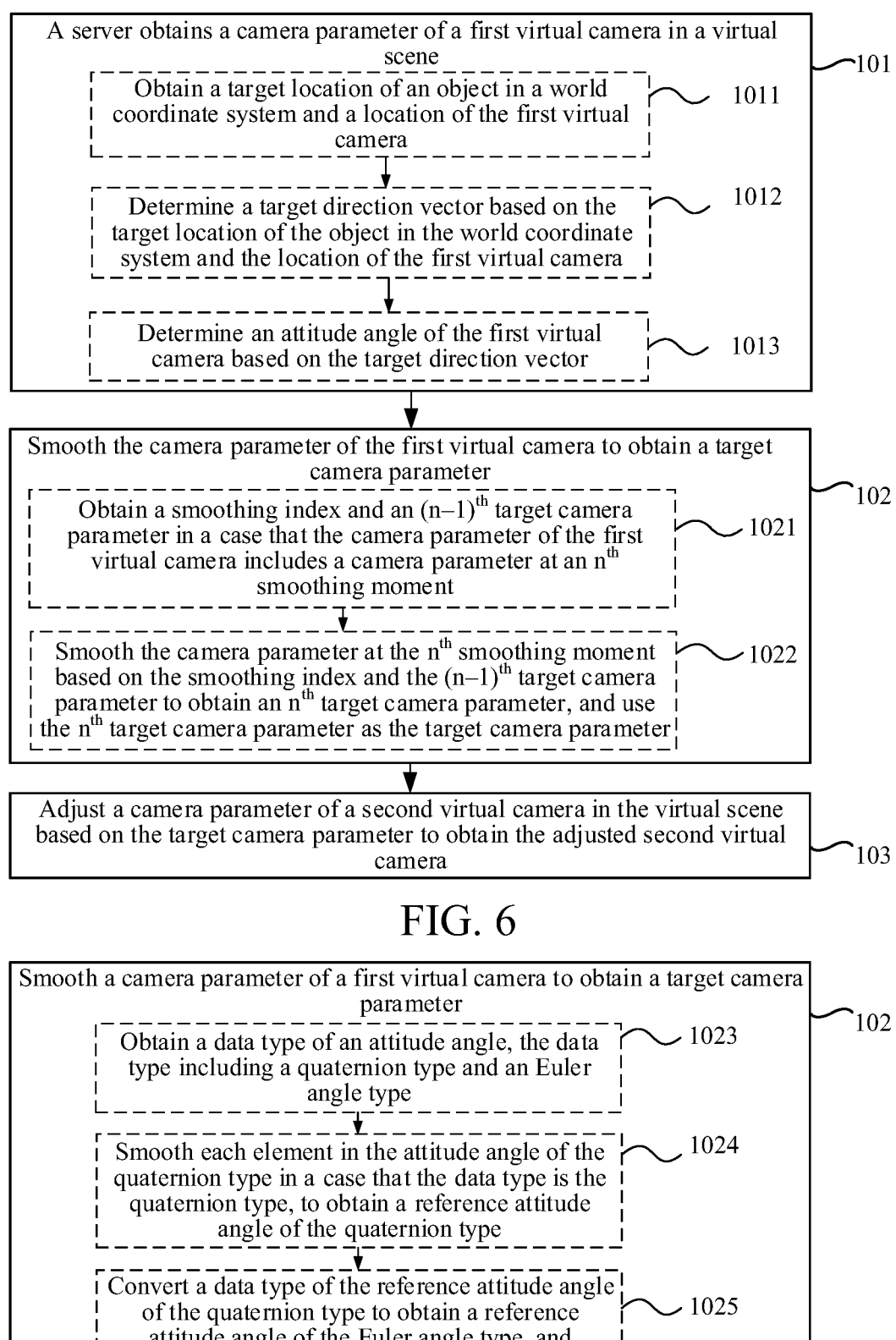

A server obtains a camera parameter of a first virtual camera in a virtual scene ~101

> Obtain a target location of an object in a world coordinate system and a location of the first virtual camera ~ 1011

> Determine a target direction vector based on the target location of the object in the world coordinate system and the location of the first virtual camera ~ 1012

> Determine an attitude angle of the first virtual camera based on the target direction vector ~ 1013

Smooth the camera parameter of the first virtual camera to obtain a target camera parameter ~102

> Obtain a smoothing index and an $(n-1)^{th}$ target camera parameter in a case that the camera parameter of the first virtual camera includes a camera parameter at an $n^{th}$ smoothing moment ~ 1021

> Smooth the camera parameter at the $n^{th}$ smoothing moment based on the smoothing index and the $(n-1)^{th}$ target camera parameter to obtain an $n^{th}$ target camera parameter, and use the $n^{th}$ target camera parameter as the target camera parameter ~ 1022

Adjust a camera parameter of a second virtual camera in the virtual scene based on the target camera parameter to obtain the adjusted second virtual camera ~ 103

FIG. 6

Smooth a camera parameter of a first virtual camera to obtain a target camera parameter ~102

> Obtain a data type of an attitude angle, the data type including a quaternion type and an Euler angle type ~ 1023

> Smooth each element in the attitude angle of the quaternion type in a case that the data type is the quaternion type, to obtain a reference attitude angle of the quaternion type ~ 1024

> Convert a data type of the reference attitude angle of the quaternion type to obtain a reference attitude angle of the Euler angle type, and determine the reference attitude angle of the Euler angle type as a target attitude angle ~ 1025

FIG. 7

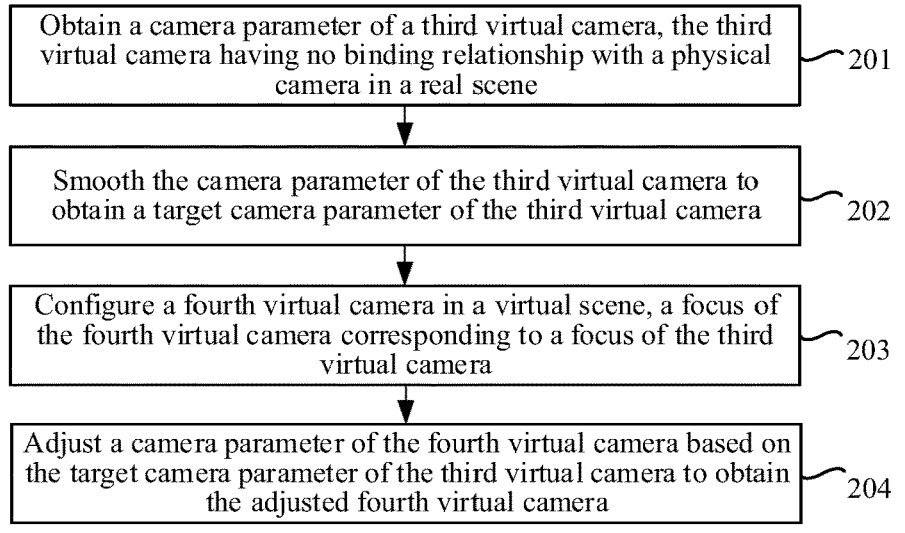

Obtain a camera parameter of a third virtual camera, the third virtual camera having no binding relationship with a physical camera in a real scene — 201

Smooth the camera parameter of the third virtual camera to obtain a target camera parameter of the third virtual camera — 202

Configure a fourth virtual camera in a virtual scene, a focus of the fourth virtual camera corresponding to a focus of the third virtual camera — 203

Adjust a camera parameter of the fourth virtual camera based on the target camera parameter of the third virtual camera to obtain the adjusted fourth virtual camera — 204

FIG. 9

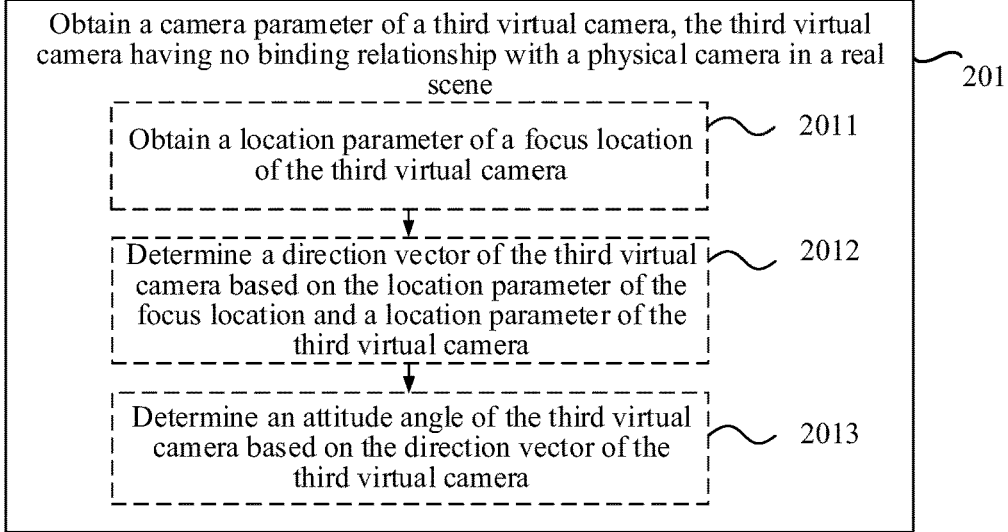

Obtain a camera parameter of a third virtual camera, the third virtual camera having no binding relationship with a physical camera in a real scene — 201

Obtain a location parameter of a focus location of the third virtual camera — 2011

Determine a direction vector of the third virtual camera based on the location parameter of the focus location and a location parameter of the third virtual camera — 2012

Determine an attitude angle of the third virtual camera based on the direction vector of the third virtual camera — 2013

FIG. 10

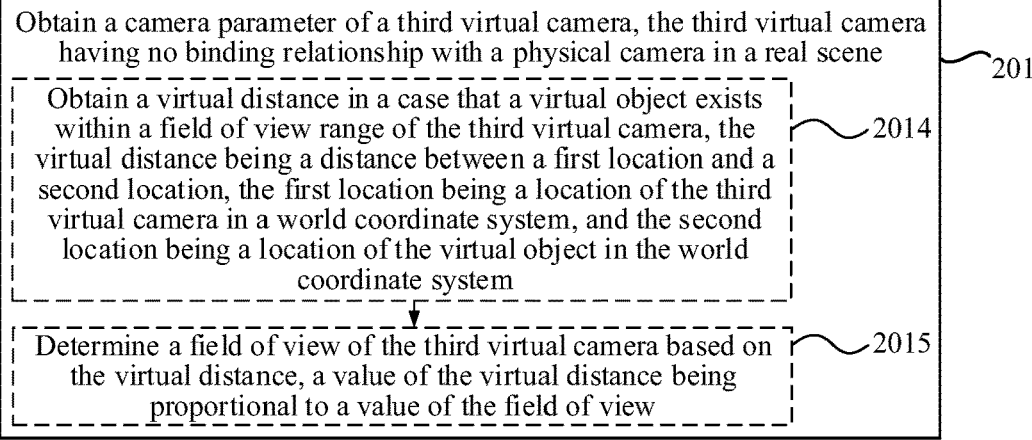

Obtain a camera parameter of a third virtual camera, the third virtual camera having no binding relationship with a physical camera in a real scene — 201

Obtain a virtual distance in a case that a virtual object exists within a field of view range of the third virtual camera, the virtual distance being a distance between a first location and a second location, the first location being a location of the third virtual camera in a world coordinate system, and the second location being a location of the virtual object in the world coordinate system — 2014

Determine a field of view of the third virtual camera based on the virtual distance, a value of the virtual distance being proportional to a value of the field of view — 2015

FIG. 11

PARAMETER PROCESSING METHOD AND APPARATUS FOR VIRTUAL CAMERA, DEVICE, STORAGE MEDIUM, AND PROGRAM PRODUCT

CROSS-REFERENCE TO RELATED APPLICATIONS

This application is a continuation application of International Application No. PCT/CN2023/114226 filed on Aug. 22, 2023, which claims priority to Chinese Patent Application No. 202211095639.3, filed with the China National Intellectual Property Administration on Sep. 5, 2022, the disclosures of each being incorporated by reference herein in their entireties.

FIELD

The disclosure relates to the field of computer technologies, and in particular, to a parameter processing method and apparatus for a virtual camera, an electronic device, a computer-readable storage medium, and a computer program product.

BACKGROUND

A virtual-real fusion technology is a technology that cleverly integrates a virtual scene and a real scene, and widely used in many technical fields such as multimedia video production, three-dimensional modeling, online conferences, real-time registration, intelligent interaction, and sensing. Virtual-real fusion is mainly embodied in virtual-real combination, real-time interaction, and three-dimensional interaction matching, and the like, and is mainly implemented by a display technology, an interactive technology, a sensing technology, and a computer image and image technology.

In a virtual-real fusion scene of the related art, a hardware stabilizer (for example, a camera pan-tilt) is generally used to implement anti-jitter of a camera. Costs of the hardware stabilizer are extremely high, so the hardware costs of anti-jitter in the related art are extremely high and stability performance is poor.

SUMMARY

Some embodiments provide a parameter processing method and apparatus for a virtual camera, an electronic device, a computer-readable storage medium, and a computer program product, capable of effectively improving stable performance of a virtual camera in a virtual-real fusion scene.

Some embodiments provide a parameter processing method for a virtual camera, including: obtaining a camera parameter of a first virtual camera in a virtual scene, the first virtual camera having a binding relationship with a physical camera in a real scene and the physical camera being configured to obtain image data of an object in the real scene; smoothing the camera parameter of the first virtual camera to obtain a target camera parameter; and configuring a second virtual camera in the virtual scene and adjusting a camera parameter of the second virtual camera in the virtual scene based on the target camera parameter to obtain an adjusted second virtual camera, a focus of the second virtual camera corresponding to a focus of the first virtual camera, wherein the adjusted second virtual camera is configured for rendering based on the image data to obtain an image of the virtual scene including the object.

Some embodiments provide a parameter processing apparatus for a virtual camera, including: at least one memory configured to store program code; and at least one processor to read the program code and operate as instructed by the program code, the program code comprising: obtaining code configured to cause at least one of the at least one processor to obtain a camera parameter of a first virtual camera in a virtual scene, the first virtual camera having a binding relationship with a physical camera in a real scene and the physical camera being configured to obtain image data of an object in the real scene; smoothing code configured to cause at least one of the at least one processor to smooth the camera parameter of the first virtual camera to obtain a target camera parameter; configuration code configured to cause at least one of the at least one processor to configure a second virtual camera in the virtual scene; and adjustment code configured to cause at least one of the at least one processor to adjust a camera parameter of the second virtual camera in the virtual scene based on the target camera parameter to obtain the adjusted second virtual camera, a focus of the second virtual camera corresponding to a focus of the first virtual camera, wherein the adjusted second virtual camera is configured for rendering based on the image data to obtain an image of the virtual scene including the object.

Some embodiments provide a computer-readable storage medium storing computer code which, when executed by at least one processor, causes the at least one processor to at least: obtain a camera parameter of a first virtual camera in a virtual scene, the first virtual camera having a binding relationship with a physical camera in a real scene and the physical camera being configured to obtain image data of an object in the real scene; smooth the camera parameter of the first virtual camera to obtain a target camera parameter; and configure a second virtual camera in the virtual scene and adjust a camera parameter of the second virtual camera based on the target camera parameter to obtain an adjusted second virtual camera, a focus of the second virtual camera corresponding to a focus of the first virtual camera, wherein the adjusted second virtual camera is configured for rendering based on the image data to obtain an image of the virtual scene comprising the object.

Some embodiments have the following beneficial effects:

Because a first virtual camera has a binding relationship with a physical camera in a real scene, the first virtual camera and the physical camera have a same camera parameter, and then smoothing on the camera parameter of the first virtual camera is equivalent to smoothing on the camera parameter of the physical camera. Because a focus of the first virtual camera corresponds to a focus of the second virtual camera, after the camera parameter of the second virtual camera is adjusted based on the target camera parameter obtained by smoothing, the target camera parameter obtained by smoothing is enabled to be transferred to the second virtual camera. In this way, the physical camera in the real scene does not need assistance of a hardware stabilizer, and even if the physical camera jitters, the camera parameter of the second virtual camera can remain stable. This effectively improves stability performance of the virtual camera, and reduces hardware costs of installing the hardware stabilizer on the physical camera, thereby significantly reducing the hardware costs.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 6 is a flowchart of a parameter processing method for a virtual camera according to some embodiments FIG. 7 is a flowchart of a parameter processing method for a virtual camera according to some embodiments.

FIG. 9 is a flowchart of a parameter processing method for a virtual camera according to some embodiments.

FIG. 10 is a flowchart of a parameter processing method for a virtual camera according to some embodiments FIG. 11 is a flowchart of a parameter processing method for a virtual camera according to some embodiments

DESCRIPTION OF EMBODIMENTS

Figure 1A:
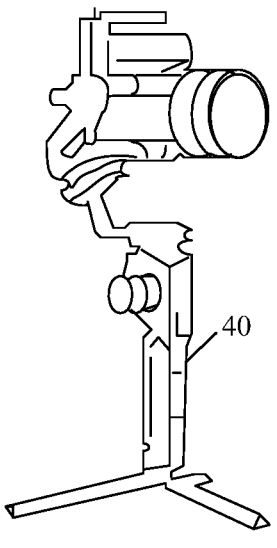
FIG. 1A is a schematic diagram of an effect according to the related art

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following description, the term "some embodiments" describes subsets of all possible embodiments, but it may be understood that "some embodiments" may be the same subset or different subsets of all the possible embodiments, and can be combined with each other without conflict.

In the following description, the terms "first", "second", and "third" are merely intended to distinguish between similar objects rather than describe specific orders. It may be understood that, the terms "first", "second", and "third" may, where permitted, be interchangeable in a particular order or sequence, so that embodiments described herein may be implemented in an order other than that illustrated or described herein.

Unless otherwise defined, meanings of all technical and scientific terms used in this specification are the same as those usually understood by a person skilled in the art to which this application belongs. Terms used in the specification are merely intended to describe the objectives of some embodiments, but are not intended to limit herein.

Before embodiments are further described in detail, a description is made on terms in some embodiments, and the terms are applicable to the following explanations.

(1) Virtual scene: It is a scene that an application displays (or provides) during running on an electronic device. The virtual scene may be a simulation environment for the real world, a semi-simulation and semi-fictional environment, or a pure fictional environment. The virtual scene may be any one of a two-dimensional virtual scene, a 2.5-dimensional virtual scene, or a three-dimensional virtual scene. A dimension of the virtual scene is not limited herein. For example, the virtual scene may include sky, land, sea, and the like. The land may include environmental elements such as a desert and a city. A user may control movement of a virtual object in the virtual scene.

(2) Virtual object: It is an image of various people and objects that can be interacted with in a virtual scene, or an active object in a virtual scene. The active object may be a virtual character, a virtual animal, an anime character, and the like, such as a person and an animal displayed in the virtual scene. The virtual object may be a virtual image that is in the virtual scene that is used for representing a user. The virtual scene may include a plurality of virtual objects, and each virtual object has a shape and a volume in the virtual scene, and occupies some space in the virtual scene.

(3) Virtual-real fusion: A virtual-real fusion technology is a technology that cleverly integrates a virtual scene and a real scene, and widely used in many technical fields such as multimedia video production, three-dimensional modeling, online conferences, real-time registration, intelligent interaction, and sensing. Virtual-real fusion is mainly embodied in virtual-real combination, real-time interaction, and three-dimensional interaction matching, and the like, and is mainly implemented by a display technology, an interactive technology, a sensing technology, and a computer image and image technology.

(4) Virtual camera: It is a "camera" arranged in computer animation software or a virtual engine for virtual photographing. The virtual photographing is implemented in a computer-generated virtual scene. A virtual camera can simulate a camera operation in real photographing by setting a camera parameter such as a location and an angle of the virtual camera. A function of the virtual camera in presenting a viewpoint in animation is equivalent to that of a conventional camera. A photographed object of the virtual camera is completely different from that of the physical camera. The physical camera takes a picture of a real character or an actually constructed scene, while the virtual camera takes a picture of a model built in three-dimensional software. The virtual camera is presented in a form of an icon in the virtual engine, also has parameters such as lens, focal length, focus, aperture, and depth of field, and can implement camera actions such as "push", "pull", "swing", "move", "track", "shake", "rise", "fall", and "comprehensive motion". The camera parameters of the virtual camera are integrated buttons or numerical input fields on a panel. The parameters of the virtual camera can be configured only when an operator enters parameters or drags a mouse.

In some embodiments, in a case that the virtual camera is bound to the physical camera, that is, in a case that the virtual camera and the physical camera have a binding relationship, the virtual camera and the bound physical camera have a same camera parameter. A matching request can be sent to a game engine (a virtual engine) via the physical camera. The game engine adds a virtual camera paired with the physical camera in the virtual scene. During moving, the physical camera sends the camera parameter of the physical camera to the virtual camera in real time. After receiving the camera parameter of the physical camera, the virtual camera synchronizes in real time based on the received camera parameter of the physical camera to ensure that a first virtual camera and the bound physical camera have a same camera parameter. In other words, the virtual camera can be regarded as a digital twin of the physical camera in the real scene bound to the virtual camera.

(5) Virtual engine: The virtual engine refers to a core component of some editable computer virtual systems or some interactive real-time image applications that have been written. These systems provide a virtual scene designer with various tools needed to write a virtual scene, and objectives of these systems are to enable the designer to write a program easily and quickly. The virtual engine includes a rendering engine (where the rendering engine includes a two-dimensional rendering engine and a three-dimensional rendering engine), a physical engine, a collision detection engine, a sound engine, a script engine, an animation engine, an artificial intelligence engine, a network engine, a scene management engine, and the like.

(6) Camera parameter: The camera parameter includes at least one of an attitude angle parameter, a field of view parameter, and a location parameter. The attitude angle parameter is also called an Euler angle due to being defined according to the Euler concept. The attitude angle includes a roll angle, a pitch angle, and a heading angle. Different rotation sequences form different coordinate transformation matrices. Spatial rotation of a coordinate system of a camera relative to an object coordinate system is generally represented in a sequence of the heading angle, the pitch angle, and the roll angle. A value of the field of view parameter is positively correlated with a field of view range of the virtual camera. The location parameter represents a three-dimensional location coordinate of the camera.

(7) Metaverse: It is digital living space that uses technology to link and create, maps the real world into an interactive virtual world, and has a new social system. The metaverse is a new Internet application and social form of virtual-real fusion resulting from integration of various new technologies. The metaverse provides immersive experience based on an extended reality technology, and generates a mirror of the real world based on a digital twin technology. The metaverse builds an economic system by blockchain technology, closely integrates a virtual world and the real world in a social system, an identity system, and the like, and allows each user to produce and edit content.

(8) In response to/Based on: It is used for representing a condition or a status on which an executed operation depends. In a case that the dependent condition or status is satisfied, the executed one or more operations may be real-time or have a set delay. There is no limit to a sequence on the plurality of executed operations unless otherwise specified.

Figure 1B:
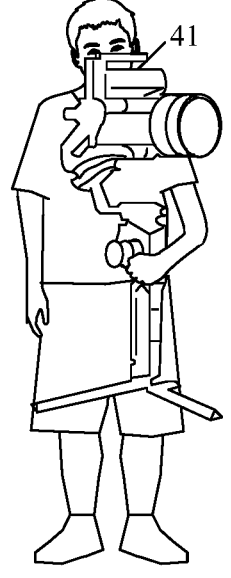
FIG. 1B is a schematic diagram of an effect according to the related art.

FIG. 1A and FIG. 1B are schematic diagrams of an effect of the related art. In the related art, anti-jitter of a camera is generally implemented by a hardware stabilizer (for example, a hardware stabilizer 40 shown in FIG. 1A, and a hardware stabilizer 41 shown in FIG. 1B). The hardware stabilizer can use a mode of installing an additional camera accessory to achieve a function such as automatic tracking of an object. However, costs of the hardware stabilizer increase with increase of costs of the camera, resulting in extremely high costs of anti-jitter.

In the related art, a feature point detection algorithm may also be used to detect feature points of each frame of an image. Motion trajectories of a same feature point are smoothed to obtain a smoothing result. Each frame of the image is zoomed in, zoomed out, rotated, cropped, or distorted based on the smoothing result to obtain a video after anti-jitter processing. However, the foregoing anti-jitter algorithm in the related art often occupies a large amount of computing resources and has a poor anti-jitter effect.

The parameter processing method for a virtual camera according to some embodiments can obtain a same high-quality stabilization effect as the hardware stabilizer compared with the foregoing related art, and complexity is extremely low, running is performed in real time, and computing resources are not occupied. In addition, only an image of a camera needs to be connected, without complex installation and debugging operations, to use immediately, so that usability is extremely high, a threshold is very low, and a physical stabilizer can be completely replaced, thereby reducing costs.

Some embodiments provide a parameter processing method and apparatus for a virtual camera, an electronic device, a computer-readable storage medium, and computer program product, capable of significantly reducing hardware costs, effectively improving stability performance of a virtual camera, and effectively improving an anti-jitter effect of the virtual camera. An exemplary application of a parameter processing system for a virtual camera according to some embodiments is described below.

Figure 2:
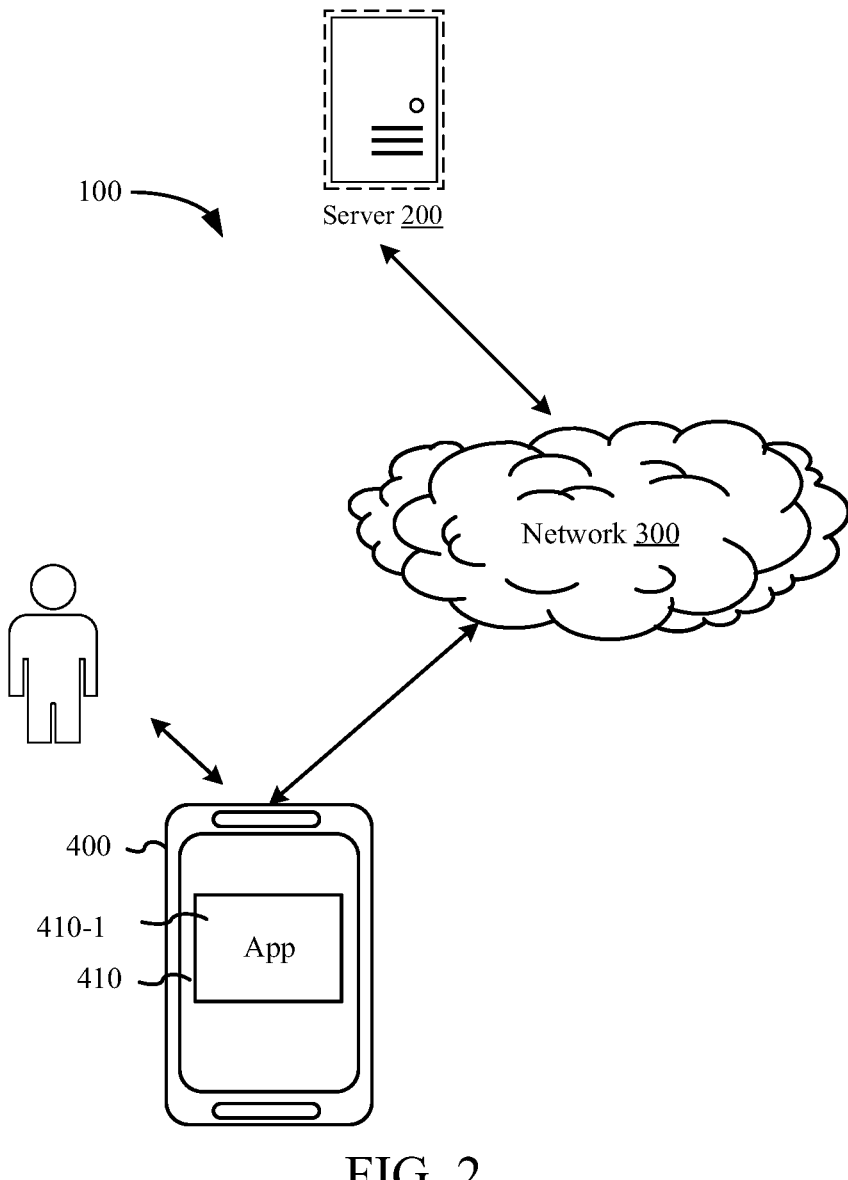
FIG. 2 is a schematic diagram of a structure of a parameter processing system architecture for a virtual camera according to some embodiments.

FIG. 2 is a schematic diagram of an architecture of a parameter processing system 100 for a virtual camera according to some embodiments. A terminal (for example, a terminal 400 as shown) is connected to a server 200 via a network 300. The network 300 may be a wide area network or a local area network, or a combination thereof.

A client 410 may be configured on the terminal 400 to display an image of a virtual scene on a graphic interface 410-1 (for example, the graphic interface 410-1 as shown). For example, an image of a virtual scene in an online game application (APP) is displayed on the graphic interface 410-1. For another example, the terminal 400 runs an online conference application APP and displays an image of a virtual scene in the graphic interface 410-1. For another example, the terminal 400 runs a video APP and displays an image of a virtual scene in the graphic interface 410-1. The terminal 400 and the server 200 are connected to each other via a wired or wireless network.

In some embodiments, the server 200 may be an independent physical server, a server cluster or distributed system composed of a plurality of physical servers, and a cloud server providing basic cloud computing services, such as cloud services, cloud databases, cloud computing, cloud functions, network services, cloud communications, middleware services, domain name services, security services, content delivery networks (CDNs), and big data and artificial intelligence platforms. The terminal 400 may be a smartphone, a tablet computer, a notebook computer, a desktop computer, a smart speaker, a smart television, a smartwatch, a vehicle-mounted terminal, or the like, but is not limited thereto. The electronic device according to some embodiments may be implemented as a terminal or as a server. The terminal and the server may be connected directly or indirectly by wired or wireless communication, and this is not limited herein.

In some embodiments, the parameter processing method for a virtual camera may also be applied to a display scene of an image of a virtual scene related to augmented reality.

For example, the terminal 400 (such as a virtual wearable terminal) is used for displaying an image of a virtual scene. The terminal 400 displays an icon of a virtual camera that can be selected by a user in the graphic interface 410-1, and determines the selected virtual camera in response to a selection operation of the user for the icon displayed in the graphic interface 410-1. The terminal 400 sends the selected virtual camera to the server 200 via the network 300. The server 200 smooths a camera parameter of the selected virtual camera to obtain a target camera parameter, and renders to obtain an image of a virtual scene by the virtual camera configured with the target camera parameter. The server 200 sends the rendered image of the virtual scene to the terminal 400. The terminal 400 displays the rendered image of the virtual scene in the graphic interface 410-1.

In some embodiments, the terminal 400 displays an icon of a virtual camera that can be selected by a user in the graphic interface 410-1, obtains a camera parameter of the selected virtual camera in response to a selection operation of the user for the icon displayed in the graphic interface 410-1, smooths the camera parameter of the selected virtual camera to obtain a target camera parameter, renders to obtain an image of a virtual scene by the virtual camera configured with the target camera parameter, and displays the rendered image of the virtual scene in the graphic interface 410-1.

In some embodiments, the terminal 400 displays an icon of a virtual camera that can be selected by a user in the graphic interface 410-1. The terminal 400 sends, in response to a selection operation of the user for the icon displayed in the graphic interface 410-1, a camera parameter of the selected virtual camera to the server 200 via the network 300. The server 200 receives the camera parameter of the selected virtual camera and sends a smoothed target camera parameter to the terminal 400. The terminal 400 receives the smoothed target camera parameter, and renders to obtain an image of a virtual scene by the virtual camera configured with the target camera parameter. The terminal 400 displays the image of the virtual scene in the graphic interface 410-1.

Some embodiments may be implemented with help of cloud technology. The cloud technology refers to a hosting technology that integrates resources such as hardware, software, and networks in a wide area network or a local area network, to implement computing, storage, processing, and sharing of data.

Figures 3, 4:
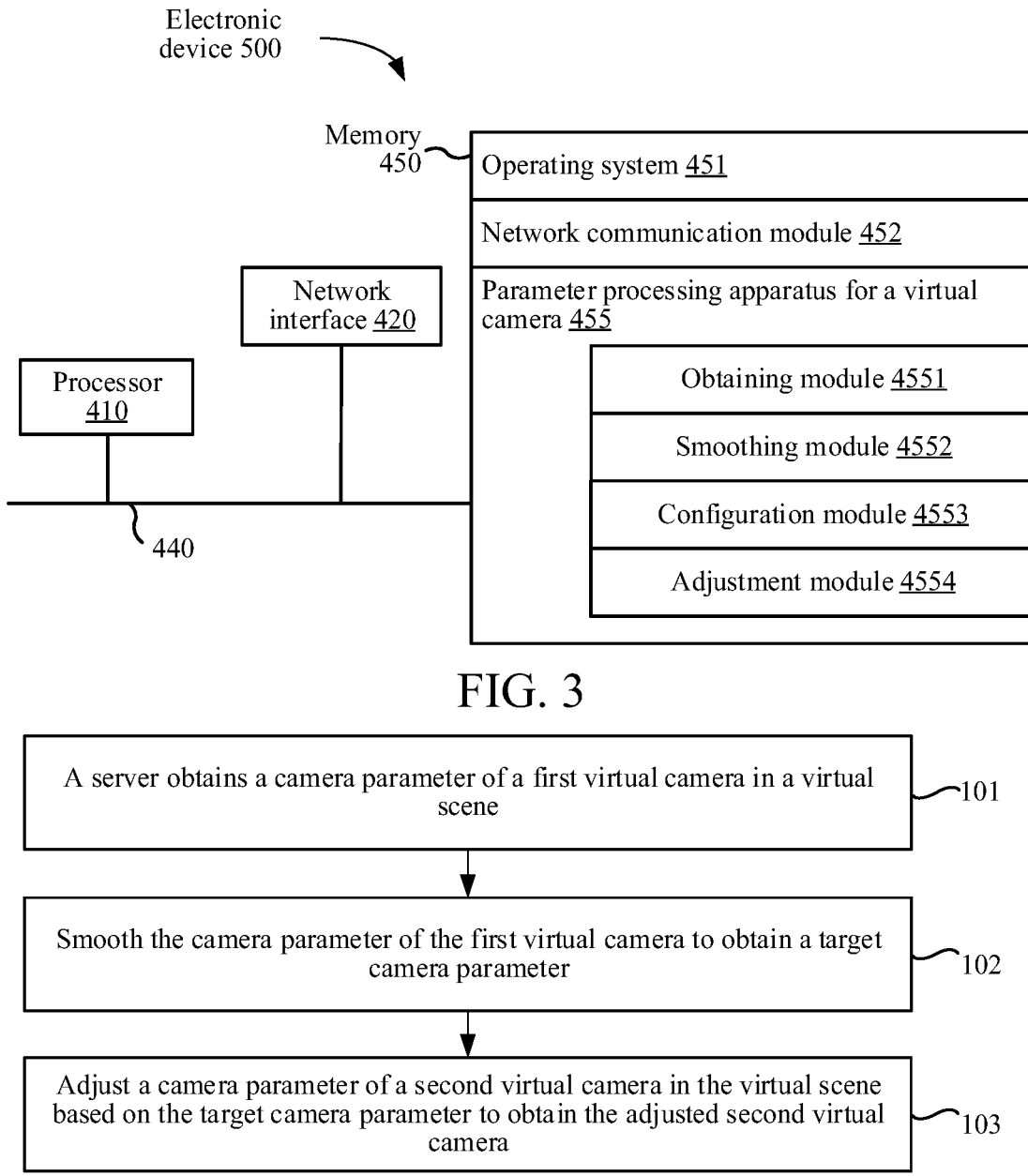
FIG. 3 is a schematic diagram of a structure of an electronic device according to some embodiments.
FIG. 4 is a flowchart of a parameter processing method for a virtual camera according to some embodiments.

FIG. 3 is a schematic diagram of a structure of an electronic device 500 for parameter processing of a virtual camera according to some embodiments. The electronic device 500 shown in FIG. 3 may be the server 200 or the terminal 400 in FIG. 2. The electronic device 500 shown in FIG. 3 includes at least one processor 410, a memory 450, and at least one network interface 420. Components in the electronic device 500 are coupled together by using a bus system 440. It may be understood that, the bus system 440 is configured to implement connection and communication between the components. In addition to a data bus, the bus system 440 further includes a power bus, a control bus, and a state signal bus. However, for ease of clear description, all buses in FIG. 3 are marked as the bus system 440.

The processor 410 may be an integrated circuit chip with a signal processing capability, for example, a general-purpose processor, a digital signal processor (DSP), another programmable logic device, a discrete gate or a transistor logic device, or a discrete hardware component. The general-purpose processor may be a microprocessor, any conventional processor, or the like.

The memory 450 may be removable, non-removable, or a combination thereof. An exemplary hardware device includes a solid-state memory, a hard disk drive, a DVD-ROM/CD-ROM drive, and the like. The memory 450 optionally includes one or more storage devices physically located away from the processor 410.

The memory 450 may include a volatile memory or a non-volatile memory, or may include both the volatile memory and the non-volatile memory. The non-volatile memory may be a read-only memory (ROM), and the volatile memory may be a random access memory (RAM). The memory 450 described in some embodiments aims to include any suitable memory.

In some embodiments, the memory 450 can store data to support various operations, examples of the data include programs, modules, data structures, or subsets or supersets of the data. An example is as follows:

An operating system 451 includes system programs for handling various basic system services and performing hardware-related tasks, for example, a frame layer, a core library layer, and a drive layer, used for implementing various basic services and processing tasks based on hardware.

A network communication module 452 is configured to reach another electronic device via one or more (wired or wireless) network interfaces 420. An exemplary network interface 420 includes Bluetooth, wireless fidelity (Wi-Fi), a universal serial bus (USB), and the like.

In some embodiments, the parameter processing apparatus for a virtual camera may be implemented in a software manner. FIG. 3 shows a parameter processing apparatus 455 for a virtual camera stored in a memory 450. The parameter processing apparatus 455 may be software in a form of a program and a plug-in, and includes the following software modules: an obtaining module 4551, a smoothing module 4552, a configuration module 4553, and an adjustment module 4554. These modules are logical, so that the modules can be arbitrarily combined or split according to achieved functions. The following describes the functions of the modules.

In some other embodiments, the parameter processing apparatus for a virtual camera provided may be implemented in a hardware manner. As an example, the parameter processing apparatus for a virtual camera provided in some embodiments may be a processor in a form of a hardware decoding processor that is programmed to perform the parameter processing method for a virtual camera provided in some embodiments. For example, the processor in a form of a hardware decoding processor may use one or more application-specific integrated circuits (ASIC), a DSP, a programmable logic device (PLD), a complex programmable logic device (CPLD), a field programmable gate array (FPGA), or another electronic element.

In some embodiments, the terminal or the server may perform the parameter processing method for a virtual camera by running a computer program or computer-executable instructions. For example, the computer program may be a native program in an operating system (for example, a dedicated image deblurring program) or a software module, for example, a deblurring module that can be embedded in any program (for example, an instant messaging client, a photo album program, an electronic map client, a navigation client). For example, the computer program may be a native application (APP), that is, a program that needs to be installed in the operating system to run. In summary, the foregoing computer program may be any form of application, module, or plug-in.

The parameter processing method for a virtual camera provided in some embodiments is described below.

FIG. 4 is a flowchart of a parameter processing method for a virtual camera according to some embodiments, and the method is described with reference to operation 101 to operation 103 shown in FIG. 4. The parameter processing method for a virtual camera provided in some embodiments can be implemented by a server or a terminal alone, or by the server and the terminal cooperatively. The following is an example of implementation by the server alone.

In operation 101, the server obtains a camera parameter of a first virtual camera in a virtual scene.

In some embodiments, the camera parameter may include at least one of an attitude angle, a field of view, and a camera location. The first virtual camera has a binding relationship with a physical camera in a real scene. The physical camera is used for image data acquisition of an object in the real scene to obtain image data of the object.

In some embodiments, the first virtual camera has a binding relationship with the physical camera in the real scene. This means that the first virtual camera and the bound physical camera have a same camera parameter. In other words, the camera parameter of the first virtual camera changes with a change of a camera parameter of the bound physical camera and is always the same as the camera parameter of the bound physical camera. In some embodiments, the first virtual camera and the bound physical camera have the same camera parameter. A matching request can be sent to a game engine via the physical camera. The game engine adds a virtual camera paired with the physical camera in the virtual scene. During moving, the physical camera sends the camera parameter of the physical camera to the virtual camera in real time. After receiving the camera parameter of the physical camera, the virtual camera synchronizes in real time based on the received camera parameter of the physical camera to ensure that the first virtual camera and the bound physical camera have the same camera parameter.

In some embodiments, the virtual camera mentioned in the specification (such as a first virtual camera, a second virtual camera, and a third virtual camera) may be used for virtual photographing. The virtual photographing is implemented in a computer-generated virtual scene. A virtual camera can simulate a camera operation in real photographing by setting a camera parameter such as a location and an angle of the virtual camera. Using the first virtual camera in the specification as an example, because the first virtual camera has a binding relationship with the physical camera in the real scene. In other words, the first virtual camera can be regarded as a digital twin of the physical camera in the real scene bound to the virtual camera.

Figure 5:
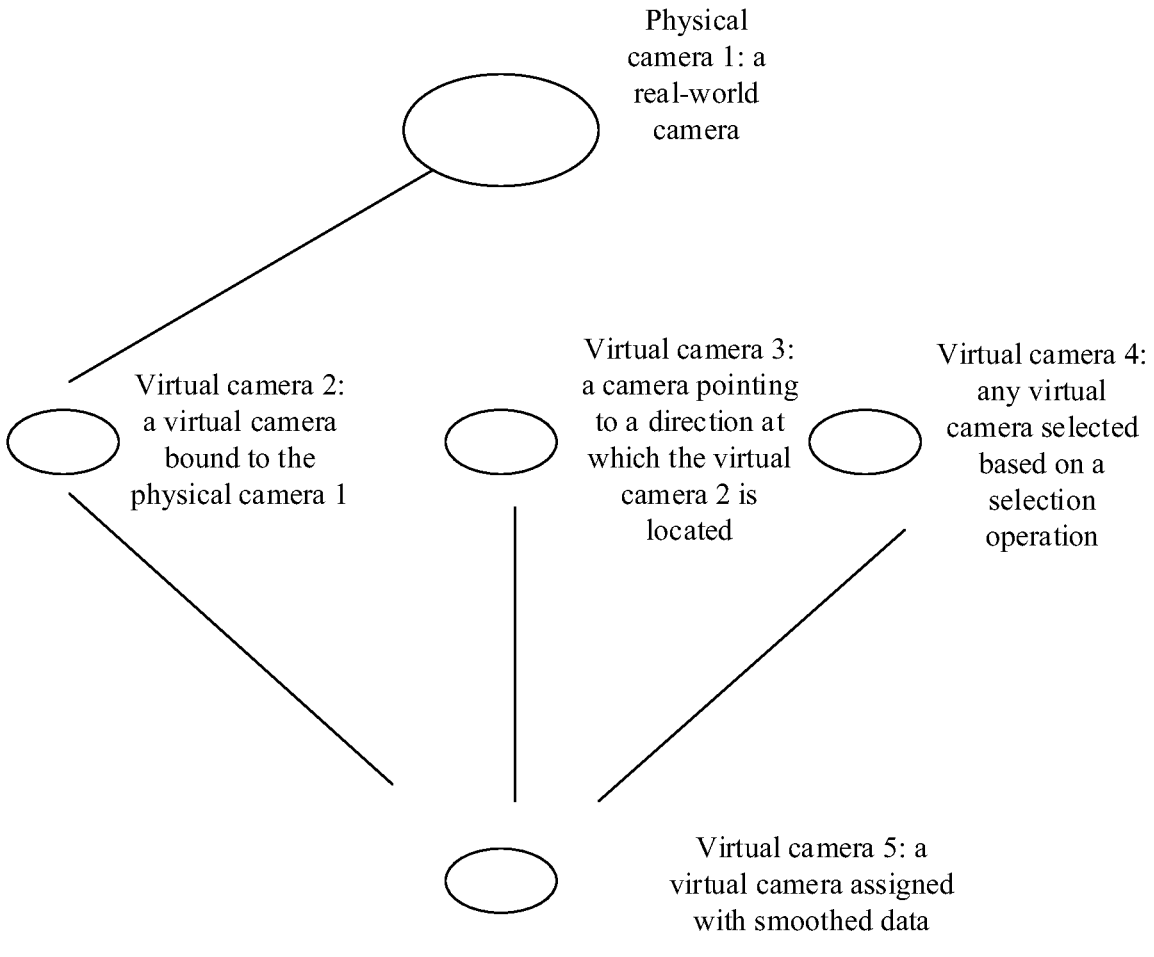
FIG. 5 is a schematic diagram of a parameter processing method for a virtual camera according to some embodiments.

As an example, FIG. 5 is a schematic diagram of a parameter processing method for a virtual camera according to some embodiments. A first virtual camera may be a virtual camera 2 that has a binding relationship with a physical camera 1 in a real scene.

In some embodiments, a virtual camera is configured for image data acquisition of a virtual object in a virtual scene to obtain image data of the virtual object.

In some embodiments, there may be at least two virtual cameras in a virtual scene. The at least two virtual cameras include a virtual camera bound to a physical camera and a virtual camera not bound to a physical camera.

In some embodiments, a camera parameter includes an attitude angle, a field of view, and a camera location. The attitude angle includes a pitch angle, a heading angle, and a roll angle. Different rotation sequences of the virtual camera form different coordinate transformation matrices. Spatial rotation of a virtual camera coordinate system relative to a geographic coordinate system is generally represented in a sequence of the heading angle, the pitch angle, and the roll angle. A size of the field of view determines a field of view range of the virtual camera. The field of view is an angle formed by using a lens of the virtual camera as a vertex, and two edges of a maximum range through which a measured object image can pass through the lens.

In some embodiments, before a server obtains the camera parameter of the first virtual camera in the virtual scene, one of a plurality of configured virtual cameras in the virtual scene needs to be selected as the first virtual camera. In some embodiments, the server may select the first virtual camera in the following manner: determining a plurality of configured virtual cameras in the virtual scene, the configured virtual cameras being respectively bound to different physical cameras; determining a selected virtual camera as the first virtual camera in response to a selection operation on the plurality of configured virtual cameras.

In some embodiments, the selection operation on the virtual camera may be triggered by a user by using a client. For example, the client displays respective camera icons of a plurality of virtual cameras that can be selected, the user triggers the selection operation on a corresponding virtual camera by triggering a camera icon, and then the client sends information of the selection operation to the server, so that the server responds to the selection operation.

In some embodiments, in an application scenario of virtual-real fusion, a plurality of real cameras are configured in the real scene, so that different real cameras can acquire data on different objects in the real scene. Virtual cameras bound to the real cameras are configured in the virtual scene to implement virtual-real fusion by using the virtual camera as a bridge between the real scene and the virtual scene.

In this way, the virtual cameras bound to the real cameras are configured in the virtual scene, and used as the configured virtual cameras. A selected virtual camera is determined as the first virtual camera in response to a selection operation on the plurality of configured virtual cameras, to determine a camera parameter of a to-be-smoothed virtual camera based on the selection. In a case of a large amount of configuration of physical cameras, an amount of configuration of virtual cameras bound to the physical cameras also increases sharply. A to-be-smoothed object is determined based on the selection operation on the configured virtual cameras, so that camera parameters of each virtual camera do not need to be smoothed. Instead, the virtual camera is selected selectively. The camera parameter of the selected virtual camera is smoothed, thereby effectively reducing a quantity of virtual cameras with camera parameters to be smoothed, effectively reducing an amount of calculation, and improving smoothing efficiency.

In some embodiments, in a case that the camera parameter includes the attitude angle, refer to FIG. 6. FIG. 6 is a flowchart of a parameter processing method for a virtual camera according to some embodiments. Operation 101 shown in FIG. 6 may be implemented by performing the following operation 1011 to operation 1013.

In operation 1011, a target location of an object in a world coordinate system and a location of a first virtual camera in a virtual scene are obtained.

In some embodiments, the world coordinate system refers to an absolute coordinate system of a system. Before a user coordinate system is established, coordinates of all points on an image are determined by origins of the coordinate system.

In some embodiments, a physical camera and a bound virtual camera are at a same location in the world coordinate system. Image data acquisition of an object is performed in a real scene by using the physical camera, and the acquired image data is sent to the virtual camera bound to the physical camera in a virtual engine.

In some embodiments, there may be at least one object in the real scene. In a case that there are a plurality of objects in the real scene, image data acquisition of different objects may be performed by using a same physical camera, or image data acquisition of different objects may be performed by using different physical cameras. For example, in a case that there are a plurality of objects, the plurality of objects are in different areas. Each area corresponds to a physical camera that performs image data acquisition of an object in the area.

In some embodiments, in a case that there is one object within a field of view range of a physical camera bound to the first virtual camera, that is, in a case that there is one object, the obtaining a target location of an object in a world coordinate system in operation 1011 may be implemented in the following manner: obtaining a plurality of joint coordinates of the object in the world coordinate system; and performing a weighted summation on the plurality of joint coordinates to obtain the target location of the object in the world coordinate system.

In some embodiments, an object in the real scene includes a plurality of joints. Different joints have different locations in the world coordinate system. The joints are bone support points of an external body of the object. The joints are at turning points of the body and play a crucial role in modeling.

In some embodiments, an expression for the target location of the object in the world coordinate system may be:

$$X = a_1 X_1 + a_2 X_2 + a_3 X_3 + \ldots + a_n X_n \tag{1}$$

X represents the target location of the object in the world coordinate system. $a_1$ represents a weight corresponding to a joint 1 of the object. $X_1$ represents a location of the joint 1 of the object in the world coordinate system. $a_2$ represents a weight corresponding to a joint 2 of the object. $X_2$ represents a location of the joint 2 of the object in the world coordinate system. $a_3$ represents a weight corresponding to a joint 3 of the object. $X_3$ represents a location of the joint 3 of the object in the world coordinate system. $a_n$ represents a weight corresponding to a joint n of the object. $X_n$ represents a location of the joint n of the object in the world coordinate system. n represents a quantity of joints of the object.

In some embodiments, weights of weighted summations corresponding to different joints are different. The weights of the weighted summations corresponding to the joints may be set according to an actual situation. A sum of the weights of the weighted summations corresponding to the joints may be equal to 1.

In this way, the target location of the object in the world coordinate system is obtained by performing weighted summations on the plurality of joint coordinates, so that the target location of the object in the world coordinate system is accurately determined, and the attitude angle of the first virtual camera is determined based on the target location subsequently, thereby effectively improving accuracy of the determined attitude angle of the first virtual camera.

In some embodiments, in a case that there are at least two objects within a field of view range of a physical camera bound to the first virtual camera, that is, in a case that there are at least two objects, the obtaining a target location of an object in a world coordinate system in operation 1011 may be implemented in the following manner: performing the following processing respectively for each object: obtaining a plurality of joint coordinates of the object in the world coordinate system; performing a weighted summation on the plurality of joint coordinates to obtain a location of the object in the world coordinate system; and determining the target location based on the location of each object in the world coordinate system, a distance between the target location and the location of each object in the world coordinate system being less than a distance threshold.

In some embodiments, the distance threshold may be set according to an actual application scenario.

In this way, in a case that there are at least two objects, the location of each object in the world coordinate system may be determined respectively, and a location where a distance between the location of each object in the world coordinate system is less than the distance threshold is determined as the target location, to accurately determine the target location, and the attitude angle of the first virtual camera is determined based on the target location subsequently, thereby effectively improving accuracy of the determined attitude angle of the first virtual camera.

In operation 1012, a target direction vector is determined based on the target location of the object in the world coordinate system and the location of the first virtual camera.

In some embodiments, the target direction vector is used for indicating, in the world coordinate system, a direction of the first virtual camera pointing to the object.

In some embodiments, the target direction vector is a vector that starts with the location of the first virtual camera in the world coordinate system and ends with the target location of the object in the world coordinate system.

In operation 1013, the attitude angle of the first virtual camera is determined based on the target direction vector.

In some embodiments, an expression for the target direction vector may be:

$$V = (x, y, z) \tag{2}$$

V represents the target direction vector. x represents a horizontal axis component of the target direction vector. y represents a longitudinal axis component of the target direction vector. z represents a vertical axis component of the target direction vector.

In some embodiments, the attitude angle includes a pitch angle and a heading angle. Operation 1013 may be implemented in the following manner: determining a cosine value of the vertical axis component of the target direction vector as the pitch angle of the first virtual camera, the vertical axis component being a component of the target direction vector on a vertical axis of the world coordinate system; determining a ratio of the longitudinal axis component and the horizontal axis component of the target direction vector as a reference ratio, the longitudinal axis component being a component of the target direction vector on a longitudinal axis of the world coordinate system, and the horizontal axis component being a component of the target direction vector on a horizontal axis of the world coordinate system; and determining a tangent value of the reference ratio value as the heading angle of the first virtual camera.

In some embodiments, the attitude angle of the first virtual camera includes a roll angle, and a size of the roll angle may be 0.

In some embodiments, an expression for the pitch angle of the first virtual camera may be:

$$Q=b_1 \sin(z) \qquad (3)$$

$b_1$ represents a pitch angle coefficient. z represents the vertical axis component of the target direction vector. Q represents the pitch angle of the first virtual camera.

In some embodiments, an expression for the heading angle of the first virtual camera may be:

$$W=b_2 \tan 2(y,x) \qquad (4)$$

W represents the heading angle of the first virtual camera. $b_2$ represents a heading angle coefficient. x represents the horizontal axis component of the target direction vector. y represents the longitudinal axis component of the target direction vector.

In this way, the pitch angle and the heading angle of the first virtual camera are accurately determined based on the target direction vector, so that smoothing can be easily carried out based on the accurate pitch angle and heading angle subsequently, thereby effectively improving accuracy of determining the pitch angle and the heading angle.

In operation 102, the camera parameter of the first virtual camera is smoothed to obtain a target camera parameter.

In some embodiments, the camera parameter of the first virtual camera includes at least one of an attitude angle, a field of view, and a camera location. The attitude angle includes a pitch angle, a heading angle, and a roll angle. Operation 102 may be implemented by performing at least one of the following processes: smoothing the attitude angle of the first virtual camera to obtain a target attitude angle; smoothing the field of view of the first virtual camera to obtain a target field of view; and smoothing the camera location of the first virtual camera to obtain a target camera location.

In some embodiments, the smoothing the attitude angle of the first virtual camera to obtain a target attitude angle may be implemented in the following manner: smoothing the pitch angle of the first virtual camera to obtain a target pitch angle; smoothing the heading angle of the first virtual camera to obtain a target heading angle; and smoothing the roll angle of the first virtual camera to obtain a target roll angle.

In some embodiments, smoothing refers to a processing manner that narrows a gap between two to-be-smoothed parameters at adjacent smoothing moments to achieve an effect of parameter smoothing. Using that a to-be-smoothed parameter is an attitude angle as an example, the first virtual camera has a plurality of smoothing moments, each smoothing moment corresponds to the attitude angle of a first virtual camera, and a gap between attitude angles at any adjacent smoothing moment is narrowed to an attitude angle difference threshold, to implement smoothing for the attitude angle of the first virtual camera.

In some embodiments, the first virtual camera has n smoothing moments. n is a positive integer greater than 1. FIG. 6 is a flowchart of a parameter processing method for a virtual camera according to some embodiments. Operation 102 shown in FIG. 6 may be implemented by performing the following operation 1021 to operation 1022.

In operation 1021, a smoothing index and an $(n-1)^{th}$ target camera parameter are obtained in a case that the camera parameter of the first virtual camera includes a camera parameter at an $n^{th}$ smoothing moment.

In some embodiments, the camera parameter at the $n^{th}$ smoothing moment is a camera parameter before the camera parameter of the first virtual camera at the $n^{th}$ smoothing moment is smoothed. The smoothing index is used for indicating a smoothness of the camera parameter. The $(n-1)^{th}$ target camera parameter is a target camera parameter obtained by smoothing the camera parameter of the first virtual camera at an $(n-1)^{th}$ smoothing moment. As an example, in a case that n=2, the smoothing index and a first target camera parameter are obtained. The first target camera parameter is a target camera parameter obtained by smoothing, at a first smoothing moment, the camera parameter of the first virtual camera.

As an example, in a case that n=3, the smoothing index and a second target camera parameter are obtained. The second target camera parameter is a target camera parameter obtained by smoothing, at a second smoothing moment, the camera parameter of the first virtual camera.

In operation 1022, the camera parameter at the $n^{th}$ smoothing moment is smoothed based on the smoothing index and the $(n-1)^{th}$ target camera parameter to obtain an $n^{th}$ target camera parameter, and the $n^{th}$ target camera parameter is used as the target camera parameter.

In some embodiments, the smoothing index is between 0 and 1. The smoothing index is used for indicating smoothness of the camera parameter. A higher smoothing index indicates higher smoothness of a corresponding camera parameter. The smoothing index may be set according to different application scenarios.

In some embodiments, the smoothing index is between 0 and 1. Operation 1022 may be implemented in the following manner: determining a product of the camera parameter at the $n^{th}$ smoothing moment and the smoothing index as a first reference parameter; determining a product of the $(n-1)^{th}$ target camera parameter and a supplementary smoothing index as a second reference parameter, the supplementary smoothing index being a difference between the smoothing index and 1; and adding the first reference parameter and the second reference parameter to obtain the $n^{th}$ target camera parameter, and using the $n^{th}$ target camera parameter as the target camera parameter. In some embodiments, an expression for the first reference parameter may be:

$$T_1=k_1\beta_n \qquad (5)$$

$T_1$ represents the first reference parameter. $k_1$ represents the smoothing index. $\beta_1$ represents the camera parameter at the $n^{th}$ smoothing moment.

In some embodiments, an expression for the second reference parameter may be:

$$T_2=(1-k_1)\alpha_{n-1} \qquad (6)$$

$T_2$ represents the second reference parameter. $k_1$ represents the smoothing index. $\alpha_{n-1}$ represents the $(n-1)^{th}$ target camera parameter. $1-k_1$ represents the supplementary smoothing index.

In some embodiments, an expression for the $n^{th}$ target camera parameter may be:

$$\alpha_n=T_1+T_2=k_1\beta_n+(1-k_1)\alpha_{n-1} \qquad (7)$$

$\alpha_n$ represents the $n^{th}$ target camera parameter. $T_1$ represents the first reference parameter. $T_2$ represents the second reference parameter.

In this way, each of the n smoothing moments of the first virtual camera is smoothed to smooth the camera parameter at each smoothing moment of the first virtual camera, so that the gap between camera parameters at any two adjacent smoothing moments does not change, thereby implementing smoothing for the camera parameter.

In some embodiments, in a case that the camera parameter includes an attitude angle, the attitude angle includes a pitch angle, a heading angle, and a roll angle. Before operation 102, a target angle may be locked in the following manner: locking the target angle in response to a lock instruction for the target angle in the attitude angle, the target angle including at least one of the pitch angle, the heading angle, and the roll angle. As an example, the pitch angle and the heading angle are locked in response to lock instructions for the pitch angle and the heading angle in the attitude angle. As an example, the pitch angle is locked in response to a lock instruction for the pitch angle in the attitude angle. As an example, the pitch angle and the roll angle are locked in response to lock instructions for the pitch angle and the roll angle in the attitude angle. In some embodiments, the target angle is locked to prevent the target angle from being smoothed.

In some embodiments, operation 102 may alternatively be implemented in the following manner: smoothing a part of the attitude angle except the target angle to obtain the target camera parameter. In this way, the part of the attitude angle except the target angle is smoothed to gradually smooth or partially smooth different attitude angles, thereby ensuring controllability of smoothing for the attitude angle and satisfying smoothing requirements in various application scenarios. In addition, progressive smoothing can be implemented, and an error rate in a smoothing process is reduced, thereby improving accuracy of the smoothing.

In some embodiments, in a case that the camera parameter includes the attitude angle, refer to FIG. 7. FIG. 7 is a flowchart of a parameter processing method for a virtual camera according to some embodiments. Operation 102 shown in FIG. 7 may be implemented by performing the following operation 1023 to operation 1025.

In operation 1023, a data type of the attitude angle is obtained, the data type including a quaternion type and an Euler angle type.

In some embodiments, for the attitude angle of the Euler angle type, the Euler angle is used for determining a set of three independent angular parameters of a virtual camera location, and includes a nutation angle, a precession angle, and a rotation angle.

In some embodiments, for the attitude angle of the quaternion type, quaternions are non-commutative extensions of complex numbers. If a set of quaternions is considered as multidimensional real number space, the quaternions represent four-dimensional space that is two-dimensional space relative to the complex numbers. As an example, an expression for the attitude angle of the quaternion type can be:

$$ai+bj+ck+d \qquad (8)$$

a, b, c, and d represent elements in the quaternion. i, j, and k represent imaginary units in the quaternion.

In operation 1024, each element in the attitude angle of the quaternion type is smoothed in a case that the data type is the quaternion type, to obtain a reference attitude angle of the quaternion type.

Figure 8:
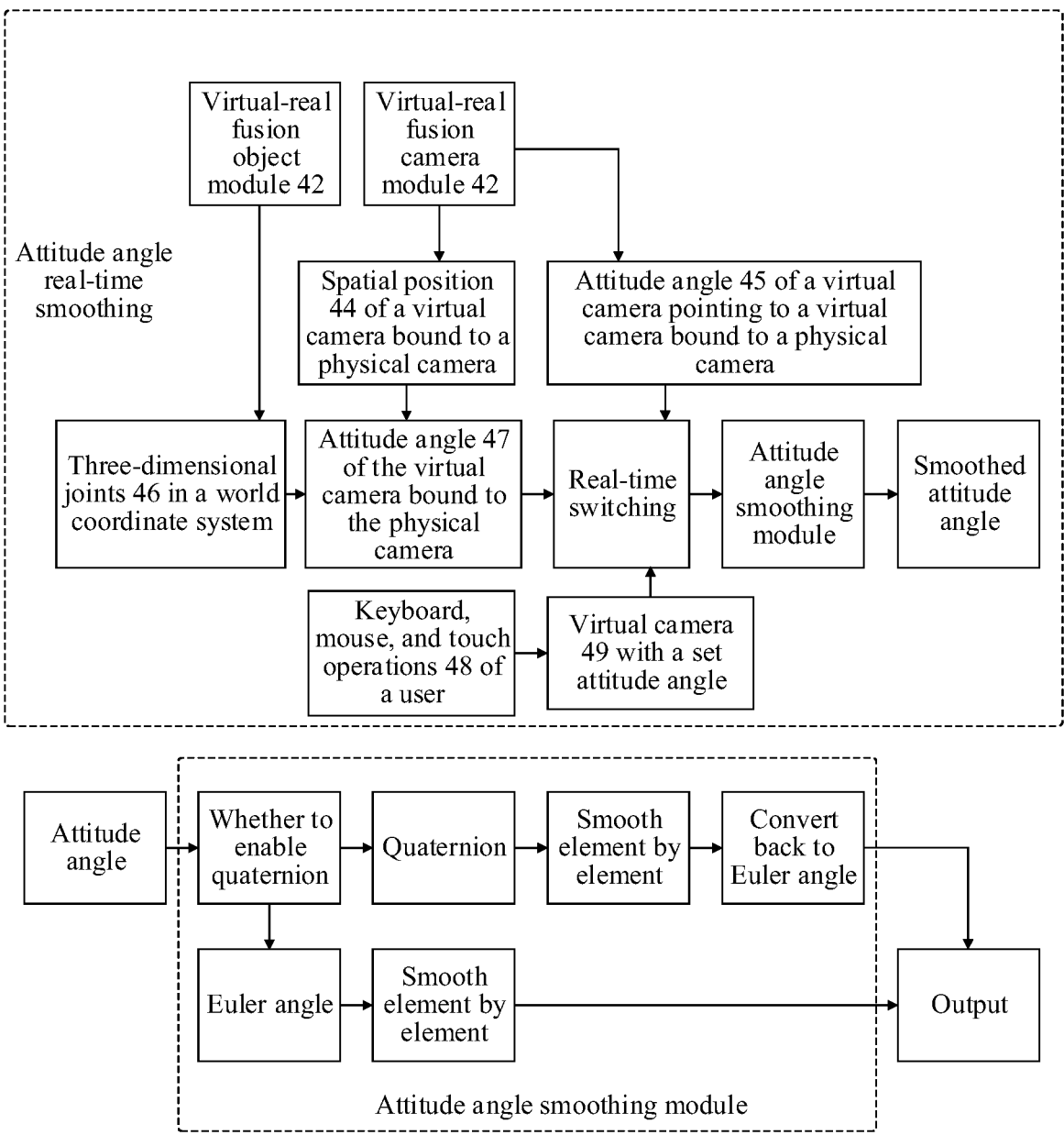
FIG. 8 is a schematic diagram of a parameter processing method for a virtual camera according to some embodiments.

As an example, FIG. 8 is a schematic diagram of a parameter processing method for a virtual camera according to some embodiments. Each element (one by one) in an attitude angle of a quaternion type is smoothed in a case that a data type is the quaternion type to obtain a reference attitude angle of the quaternion type. As an example, each element (a, b, c, and d) in an attitude angle $ai+bj+ck+d$ of a quaternion type is smoothed in a case that a data type is the quaternion type to obtain a reference attitude angle of the quaternion type.

In operation 1025, a data type of the reference attitude angle of the quaternion type is converted to obtain a reference attitude angle of the Euler angle type, and the reference attitude angle of the Euler angle type is determined as a target attitude angle.

As an example, refer to FIG. 8. A data type of the reference attitude angle of the quaternion type is converted to obtain a reference attitude angle of the Euler angle type, and the reference attitude angle of the Euler angle type is determined as a target attitude angle. In this way, based on the data type of the attitude angle, different types of attitude angle are transformed and smoothed, thereby effectively improving universality of smoothing for the attitude angle.

In operation 103, a camera parameter of a second virtual camera in the virtual scene is configured in the virtual scene and adjusted based on the target camera parameter to obtain an adjusted second virtual camera.

A focus of the second virtual camera corresponds to a focus of the first virtual camera. In some embodiments, the second virtual camera needs to be configured in the virtual scene before the camera parameter of the second virtual camera is adjusted.

In some embodiments, a meaning that a focus of the second virtual camera corresponds to a focus of the first virtual camera may be that a distance between the focus of the second virtual camera and the focus of the first virtual camera is less than a focus distance threshold (which can be set according to an actual need), or the focus of the second virtual camera coincides with the focus of the first virtual camera. For example, in a case that the distance between the focus of the second virtual camera and the focus of the first virtual camera is 0, the focus of the second virtual camera coincides with the focus of the first virtual camera.

In some embodiments, the second virtual camera needs to maintain a same perspective relation with the first virtual camera. The focus of the second virtual camera is set to be less than the focus distance threshold from the focus of the first virtual camera. In other words, a focus location of the first virtual camera and a focus location of the second virtual camera are close, so that it is ensured that the second virtual camera and the first virtual camera maintain the same perspective relation.

In this way, the second virtual camera of which a distance from the focus of the first virtual camera is less than the focus distance threshold is configured in the virtual scene, so that the second virtual camera always tracks a photographing direction of the first virtual camera to photograph, and the second virtual camera having a same photographing function and a same perspective relation as the first virtual camera is configured in the virtual scene. Therefore, the second virtual camera is used for replacing the first virtual camera for image rendering. In other words, the adjusted second virtual camera renders based on image data to obtain an image of a virtual scene including an object.

In some embodiments, a camera parameter of the adjusted second virtual camera is a target camera parameter. In other words, that a camera parameter of a second virtual camera is adjusted includes: setting the camera parameter of the second virtual camera to the target camera parameter.

In some embodiments, the target camera parameter includes at least one of a target attitude angle, a target field of view, and a target location. The camera parameter of the second virtual camera in the virtual scene may be adjusted in the following manner: adjusting the camera parameter of the second virtual camera based on at least one of the target attitude angle, the target field of view, and the target location to obtain the adjusted second virtual camera.

In some embodiments, the camera parameter of the second virtual camera in the virtual scene may be adjusted in the following manner: adjusting a current camera parameter of the second virtual camera to the target camera parameter to obtain the adjusted second virtual camera.

In some embodiments, the adjusting a current camera parameter of the second virtual camera to the target camera parameter to obtain the adjusted second virtual camera may be implemented in the following manner: adjusting a camera parameter at an $(n-1)^{th}$ smoothing moment of the second virtual camera to an $n^{th}$ target camera parameter based on the $n^{th}$ target camera parameter to obtain the adjusted second virtual camera.

In some embodiments, after adjusting the current camera parameter of the second virtual camera to the target camera parameter, the following processing may further be performed: adjusting the target camera parameter in response to an adjustment instruction for the target camera parameter to obtain the adjusted second virtual camera. In other words, after the camera parameter of the second virtual camera is adjusted to the target camera parameter, a user can adjust the target camera parameter of the second virtual camera by triggering the adjustment instruction. For example, in a case that the target camera parameter includes the target field of view, the user can adjust the target field of view of the second virtual camera by triggering the adjustment instruction.

In some embodiments, the adjusted second virtual camera is used for rendering based on image data to obtain an image of a virtual scene including an object.

In this way, a camera parameter of a first virtual camera bound to a physical camera is obtained, and the camera parameter of the first virtual camera is smoothed to obtain a target camera parameter. A camera parameter of a second virtual camera is adjusted based on the target camera parameter to obtain the adjusted second virtual camera. Image data acquired by the physical camera is rendered by the adjusted second virtual camera to obtain an image of a virtual scene including an object. During image rendering of virtual-real fusion, because the first virtual camera has a binding relationship with the physical camera in a real scene, the first virtual camera and the physical camera have a same camera parameter, and then smoothing on the camera parameter of the first virtual camera is equivalent to smoothing on the camera parameter of the physical camera. In addition, the second virtual camera corresponding to a focus of the first virtual camera is configured to transfer the target camera parameter obtained by smoothing to the second virtual camera. In this way, the physical camera in the real scene does not need assistance of a hardware stabilizer, and even if the physical camera jitters, the camera parameter of the second virtual camera can remain stable. This effectively improves stability performance of the virtual camera, and reduces hardware costs of installing a hardware stabilizer on the physical camera, thereby significantly reducing the hardware costs.

FIG. 9 is a flowchart of a parameter processing method for a virtual camera according to some embodiments, and is described with reference to operation 201 to operation 204. An execution entity of operation 201 to operation 204 may be a server or a terminal, or may be implemented collaboratively by the server and the terminal. The following uses an example in which the execution entity is a server for description.

In operation 201, a camera parameter of a third virtual camera is obtained, the third virtual camera having no binding relationship with a physical camera in a real scene.

In some embodiments, the camera parameter of the third virtual camera includes at least one of an attitude angle, a field of view, and a camera location. The third virtual camera does not have the binding relationship with the physical camera in the real scene. The physical camera is used for image data acquisition of an object in the real scene to obtain image data of the object.

In some embodiments, a virtual camera is used for image data acquisition of a virtual object in a virtual scene to obtain image data of the virtual object.

In some embodiments, the camera parameter of the third virtual camera includes at least one of an attitude angle, a field of view, and a camera location. The attitude angle includes a pitch angle, a heading angle, and a roll angle. Different rotation sequences of the virtual camera form different coordinate transformation matrices. Spatial rotation of a virtual camera coordinate system relative to a geographic coordinate system is generally represented in a sequence of the heading angle, the pitch angle, and the roll angle. A size of the field of view determines a field of view range of the virtual camera. The field of view is an angle formed by using a lens of the virtual camera as a vertex, and two edges of a maximum range through which a measured object image can pass through the lens.

In some embodiments, before operation 201, the third virtual camera may alternatively be selected in the following manner: determining a plurality of configured third virtual cameras in the virtual scene; determining a selected third virtual camera as the third virtual camera in response to a selection operation on the plurality of configured third virtual cameras.

In some embodiments, the selection operation on the third virtual camera may be triggered by a user through a client. For example, the client displays respective camera icons of a plurality of virtual cameras that can be selected, the user triggers the selection operation on a corresponding virtual camera by triggering a camera icon, and then the client sends information of the selection operation to the server, so that the server responds to the selection operation, thereby determining the virtual camera selected by the user as the third virtual camera.

In some embodiments, in a case that the camera parameter of the third virtual camera includes the attitude angle, refer to FIG. 10. FIG. 10 is a flowchart of a parameter processing method for a virtual camera according to some embodiments. Operation 201 shown in FIG. 10 may be implemented by performing the following operation 2011 to operation 2013.

In operation 2011, a location parameter of a focus location of the third virtual camera is obtained.

In some embodiments, the location parameter of the focus location of the third virtual camera is a location coordinate of the third virtual camera in a world coordinate system.

In some embodiments, the world coordinate system refers to an absolute coordinate system of a system. Before a user coordinate system is established, coordinates of all points on an image are determined by origins of the coordinate system.

In operation 2012, a direction vector of the third virtual camera is determined based on the location parameter of the focus location and a location parameter of the third virtual camera.

In some embodiments, the direction vector of the third virtual camera is used for indicating a direction to which the third virtual camera points in the world coordinate system.

In some embodiments, the direction vector of the third virtual camera is a vector that starts with a location of the third virtual camera and ends with the focus location of the third virtual camera in the world coordinate system.

In operation 2013, the attitude angle of the third virtual camera is determined based on the direction vector of the third virtual camera.

In some embodiments, an expression for the direction vector of the third virtual camera may be:

$$T=(x1,y1,z1) \tag{9}$$

T represents may the direction vector of the third virtual camera. x1 represents a horizontal axis component of the direction vector of the third virtual camera. y1 represents a longitudinal axis component of the direction vector of the third virtual camera. z1 represents a vertical axis component of the direction vector of the third virtual camera.

In some embodiments, the attitude angle includes a pitch angle and a heading angle. Operation 2013 may be implemented in the following manner: determining a cosine value of the vertical axis component of the direction vector of the third virtual camera as the pitch angle of the third virtual camera, the vertical axis component being a component of the direction vector of the third virtual camera on a vertical axis of the world coordinate system; determining a ratio of the longitudinal axis component and the horizontal axis component of the direction vector of the third virtual camera as a reference ratio, the longitudinal axis component being a component of the target direction vector on a longitudinal axis of the world coordinate system, and the horizontal axis component being a component of the target direction vector on a horizontal axis of the world coordinate system; and determining a tangent value of the reference ratio value as the heading angle of the third virtual camera.

In some embodiments, the attitude angle of the third virtual camera includes a roll angle, and a size of the roll angle may be 0.

In some embodiments, an expression for the pitch angle of the third virtual camera may be:

$$Q2=b_3 \sin(z1) \tag{10}$$

$b_3$ represents a pitch angle coefficient. z1 represents the vertical axis component of the direction vector of the third virtual camera. Q2 represents the pitch angle of the third virtual camera.

In some embodiments, an expression for the heading angle of the third virtual camera may be:

$$W2=b_4 \tan 2(y1,x1) \tag{11}$$

W2 represents the heading angle of the third virtual camera. $b_4$ represents a heading angle coefficient. x1 represents the horizontal axis component of the direction vector of the third virtual camera. y1 represents the longitudinal axis component of the direction vector of the third virtual camera.

In this way, the pitch angle and the heading angle of the third virtual camera are accurately determined based on the direction vector of the third virtual camera, so that smoothing can be easily carried out based on the accurate pitch angle and heading angle subsequently, thereby effectively improving accuracy of the pitch angle and the heading angle.

In some embodiments, in a case that the camera parameter includes the field of view, refer to FIG. 11. FIG. 11 is a flowchart of a parameter processing method for a virtual camera according to some embodiments. Operation 201 shown in FIG. 11 may be implemented by performing the following operation 2014 to operation 2015.

In operation 2014, a virtual distance is obtained in a case that a virtual object exists within a field of view range of a third virtual camera, the virtual distance being a distance between a first location and a second location, the first location being a location of the third virtual camera in a world coordinate system, and the second location being a location of the virtual object in the world coordinate system.

In some embodiments, in a case that the virtual object exists within a field of view range of the third virtual camera, the virtual distance between the location of the third virtual camera in the world coordinate system and the location of the virtual object in the world coordinate system is obtained.

In operation 2015, the field of view of the third virtual camera is obtained based on the virtual distance, a value of the virtual distance being proportional to a value of the field of view.

In some embodiments, the field of view of the third virtual camera is determined based on the obtained value of the virtual distance. In a case that the virtual distance decreases, the field of view of the third virtual camera decreases. In a case that the virtual distance increases, the field of view of the third virtual camera increases.

In this way, the field of view of the third virtual camera is dynamically controlled based on the value of the virtual distance, so that the field of view of the third virtual camera changes correspondingly with a change of the value of the virtual distance. Therefore, dynamic control of the field of view of the third virtual camera is implemented, and automatic pushing, pulling, swinging, and moving of the field of view of the third virtual camera is implemented, thereby effectively improving a camera movement effect of the third virtual camera.

In operation 202, the camera parameter of the third virtual camera is smoothed to obtain a target camera parameter of the third virtual camera.

In some embodiments, the camera parameter of the third virtual camera includes at least one of an attitude angle, a field of view, and a camera location. The attitude angle includes a pitch angle, a heading angle, and a roll angle. Operation 202 may be implemented by performing at least one of the following processes: smoothing the attitude angle of the third virtual camera to obtain a target attitude angle parameter; smoothing the field of view of the third virtual camera to obtain a target field of view parameter; and smoothing the camera location of the third virtual camera to obtain a target camera location parameter.

In some embodiments, the smoothing the attitude angle of the third virtual camera to obtain a target attitude angle mat be implemented in the following manner: smoothing the pitch angle of the third virtual camera to obtain a target pitch angle parameter; smoothing the heading angle of the third virtual camera to obtain a target heading angle parameter; and smoothing the roll angle of the third virtual camera to obtain a target roll angle parameter.

In some embodiments, smoothing refers to a processing manner that narrows a gap between two to-be-smoothed parameters at adjacent smoothing moments to achieve an effect of parameter smoothing.

In some embodiments, the third virtual camera has n smoothing moments. n is a positive integer greater than 1. Operation 202 may be implemented in the following manner: obtaining a smoothing index and an $(n-1)^{th}$ target camera parameter in a case that the camera parameter of the third virtual camera includes a camera parameter at an $n^{th}$ smoothing moment; and smoothing the camera parameter at the $n^{th}$ smoothing moment based on the smoothing index and the $(n-1)^{th}$ target camera parameter to obtain an $n^{th}$ target camera parameter, and using the $n^{th}$ target camera parameter as the target camera parameter.

In some embodiments, the camera parameter at the $n^{th}$ smoothing moment is a camera parameter before the camera parameter of the third virtual camera is smoothed at the $n^{th}$ smoothing moment.

In some embodiments, the smoothing index is used for indicating smoothness of the camera parameter. The $(n-1)^{th}$ target camera parameter is a target camera parameter obtained by smoothing the camera parameter of the third virtual camera at an $(n-1)^{th}$ smoothing moment.

As an example, in a case that n=2, the smoothing index and a first target camera parameter are obtained. The first target camera parameter is a target camera parameter obtained by smoothing the camera parameter of the third virtual camera at a first smoothing moment.

As an example, in a case that n=3, the smoothing index and a second target camera parameter are obtained. The second target camera parameter is a target camera parameter obtained by smoothing the camera parameter of the third virtual camera at a second smoothing moment.

In some embodiments, the smoothing index is between 0 and 1. The smoothing index is used for indicating smoothness of the camera parameter. A higher smoothing index indicates higher smoothness of a corresponding camera parameter. The smoothing index may be specifically set according to different application scenarios.

In some embodiments, the smoothing index is between 0 and 1, and the smoothing the camera parameter at the $n^{th}$ smoothing moment based on the smoothing index and the $(n-1)^{th}$ target camera parameter to obtain an $n^{th}$ target camera parameter, and using the $n^{th}$ target camera parameter as the target camera parameter may be implemented in the following manner: determining a product of the camera parameter at the $n^{th}$ smoothing moment and the smoothing index as a third reference parameter; determining a product of the $(n-1)^{th}$ target camera parameter and a supplementary smoothing index as a fourth reference parameter, the supplementary smoothing index being a difference between the smoothing index and 1; and adding the third reference parameter and the fourth reference parameter to obtain the $n^{th}$ target camera parameter, and using the $n^{th}$ target camera parameter as the target camera parameter.

In some embodiments, an expression for the third reference parameter may be:

$$T_3 = k_3\beta_n \tag{12}$$

$T_3$ represents the third reference parameter. $k_3$ represents the smoothing index. $\beta_n$ represents the camera parameter at the $n^{th}$ smoothing moment.

In some embodiments, an expression for the fourth reference parameter may be:

$$T_4 = (1-k_3)\alpha_{n-1} \tag{13}$$

$T_2$ represents the fourth reference parameter. $k_3$ represents the smoothing index. $\alpha_{n-1}$ represents the $(n-1)^{th}$ target camera parameter. $1-k_3$ represents the supplementary smoothing index.

In some embodiments, an expression for the $n^{th}$ target camera parameter may be:

$$\alpha_n = T_3 + T_4 = k_3\beta_n + (1-k_3)\alpha_{n-1} \tag{14}$$

$\alpha_n$ represents the $n^{th}$ target camera parameter. $T_3$ represents the third reference parameter. $T_4$ represents the fourth reference parameter.

In this way, each of the n smoothing moments of the third virtual camera is smoothed to smooth the camera parameter at each smoothing moment of the third virtual camera, so that the gap between the camera parameters at any two adjacent smoothing moments does not change, thereby implementing smoothing for the camera parameter.

In operation 203, a fourth virtual camera is configured in the virtual scene, a focus of the fourth virtual camera corresponding to a focus of the third virtual camera.

In some embodiments, a meaning that a focus of the fourth virtual camera corresponds to a focus of the third virtual camera may be that a distance between the focus of the fourth virtual camera and the focus of the third virtual camera is less than a focus distance threshold. In other words, the distance between the focus of the fourth virtual camera and the focus of the third virtual camera may be 0. In a case that the distance between the focus of the fourth virtual camera and the focus of the third virtual camera is 0, the focus of the fourth virtual camera coincides with the focus of the third virtual camera.

In some embodiments, the fourth virtual camera needs to maintain a same perspective relation with the third virtual camera. The focus of the fourth virtual camera is set to be less than the focus distance threshold from the focus of the third virtual camera. In other words, a focus location of the third virtual camera and a focus location of the fourth virtual camera are close, so that it is ensured that the fourth virtual camera and the third virtual camera maintain the same perspective relation.

In this way, the fourth virtual camera of which a distance from the focus of the third virtual camera is less than the focus distance threshold is configured in the virtual scene, so that the fourth virtual camera always tracks a photographing direction of the third virtual camera to photograph, and the fourth virtual camera having a same photographing function and a same perspective relation with the third virtual camera is configured in the virtual scene, to replace the third virtual camera to render based on image data, to obtain an image of a virtual scene including an object.

In operation 204, a camera parameter of the fourth virtual camera is adjusted based on the target camera parameter of the third virtual camera to obtain the adjusted fourth virtual camera.

In some embodiments, the adjusted fourth virtual camera is used for rendering to obtain the image of the virtual scene.

In some embodiments, the target camera parameter of the third virtual camera includes at least one of the target attitude angle parameter of the third virtual camera, the target field of view parameter of the third virtual camera, and the target location parameter of the third virtual camera. Operation 204 may be implemented in the following manner: adjusting the camera parameter of the fourth virtual camera based on at least one of the target attitude angle parameter of the third virtual camera, the target field of view parameter of the third virtual camera, and the target location parameter of the third virtual camera to obtain the adjusted fourth virtual camera.

In some embodiments, operation 204 may be implemented in the following manner: adjusting a current camera parameter of the fourth virtual camera to the target camera parameter to obtain the adjusted fourth virtual camera.

In some embodiments, the adjusting a current camera parameter of the fourth virtual camera to the target camera parameter to obtain the adjusted fourth virtual camera may be implemented in the following manner: adjusting a camera parameter at an $(n-1)^{th}$ smoothing moment of the fourth virtual camera to an $n^{th}$ target camera parameter based on the $n^{th}$ target camera parameter to obtain the adjusted fourth virtual camera.

In some embodiments, after adjusting the current camera parameter of the fourth virtual camera to the target camera parameter, the following processing may further be performed: adjusting the target camera parameter in response to an adjustment instruction for the target camera parameter to obtain the adjusted fourth virtual camera.

In some embodiments, the image rendered by the fourth virtual camera may jitter in the following manner: adding a jitter parameter to a camera parameter of the adjusted fourth virtual camera in response to a jitter parameter adding instruction for the adjusted fourth virtual camera, to enable an image rendered by the fourth virtual camera with the added jitter parameter to produce a shaking effect.

In this way, the jitter parameter is added to the camera parameter of the adjusted fourth virtual camera, so that reverse application of anti-jitter processing is implemented, and the image rendered by the fourth virtual camera can produce a shaking effect, to imitate an earthquake effect in a real scene, so that an image rendered by the adjusted fourth virtual camera is realistic.

In this way, a camera parameter of a first virtual camera bound to a physical camera is obtained, and the camera parameter of the first virtual camera is smoothed to obtain a target camera parameter. A camera parameter of a second virtual camera is adjusted based on the target camera parameter to obtain the adjusted second virtual camera. Image data acquired by the physical camera is rendered by the adjusted second virtual camera to obtain an image of a virtual scene including an object. During image rendering of virtual-real fusion, because the first virtual camera has a binding relationship with the physical camera in a real scene, the first virtual camera and the physical camera have a same camera parameter, and then smoothing on the camera parameter of the first virtual camera is equivalent to smoothing on the camera parameter of the physical camera. In addition, the second virtual camera corresponding to a focus of the first virtual camera is configured to transfer the target camera parameter obtained by smoothing to the second virtual camera. In this way, the physical camera in the real scene does not need assistance of a hardware stabilizer, and even if the physical camera jitters, the camera parameter of the second virtual camera can remain stable. This effectively improves stability performance of the virtual camera, and reduces hardware costs of installing a hardware stabilizer on the physical camera, thereby significantly reducing the hardware costs.

The following describes some embodiments in an application scenario of actual virtual-real fusion.

In the application scenario of virtual-real fusion, a virtual object and the real world can be displayed in a same line of sight. Image perception of virtual-real fusion can be effectively improved according to the parameter processing method for a virtual camera provided in some embodiments. For example, in application scenarios of livestreaming and video production, a physical camera can be freely controlled to photograph and stability of an image is ensured, thereby improving image perception. Tracking a physical object (that is, the object in the real scene described above) can achieve a smooth camera movement effect far beyond manual camera movement, thereby improving image quality. In application scenarios such as education, online conferences, and interactive games, a high-quality camera movement effect can be achieved. For example, a physical object (person) can stand in the starry sky (virtual scene).

In some embodiments, a camera parameter of an original virtual-real fusion camera (that is, the first virtual camera described above) in the virtual scene are smoothed to obtain a smoothed camera parameter, and the smoothed camera parameter is configured for a smoothed virtual camera (that is, the second virtual camera described above), thereby effectively avoiding affecting an image rendering effect due to jitters of the original virtual-real fusion camera, and effectively improving the image rendering effect.

In some embodiments, in the application scenario of virtual-real fusion, a smoothed virtual camera can be configured in the virtual scene, and a focus coordinate of the smoothed virtual camera coincides with a focus coordinate of the original virtual-real fusion camera in the virtual scene. In this way, a direction of the smoothed virtual camera can be consistent with a direction of the original virtual-real fusion camera in the virtual scene, thereby implementing functions such as automatic tracking and anti-jitter.

If there is only a slight difference between the focus of the smoothed virtual camera and the focus of the original virtual-real fusion camera, a perspective relationship is basically correct. In other words, a focus distance of the smoothed virtual camera and the original virtual-real fusion camera is less than a distance threshold. The distance threshold can be set according to an application scenario.

Figure 12:
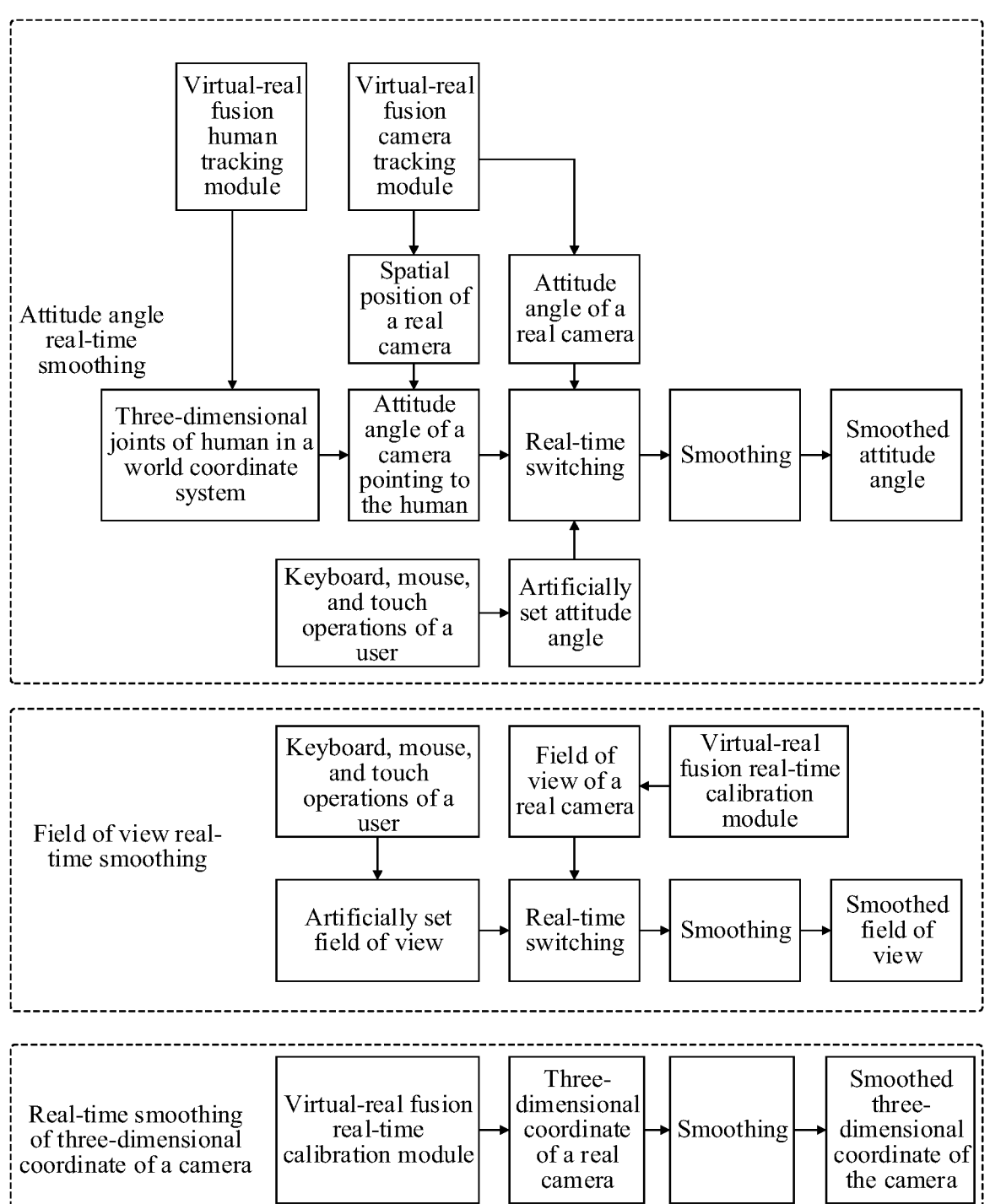
FIG. 12 is a schematic diagram of a parameter processing method for a virtual camera according to some embodiments.

FIG. 12 is a schematic diagram of a parameter processing method for a virtual camera according to some embodiments. An original virtual camera in a virtual scene may be a virtual camera selected by a user. The original virtual camera may be a virtual camera having a binding relationship with a physical camera, or a virtual camera having no binding relationship with a physical camera. A camera parameter of the original virtual camera includes an attitude angle, a field of view, and a three-dimensional coordinate. That the camera parameter of the original virtual camera is smoothed to obtain a smoothed camera parameter may be implemented in the following manner: The attitude angle, the field of view, and the three-dimensional coordinate are smoothed respectively to obtain a smoothed attitude angle, a smoothed field of view, and a smoothed three-dimensional coordinate. The following describes smoothing on the attitude angle, the field of view, and the three-dimensional coordinate separately with reference to FIG. 12.

The smoothing on the attitude angle is described first. Refer to FIG. 12 and FIG. 9. FIG. 12 is a schematic diagram of a parameter processing method for a virtual camera according to some embodiments. A to-be-smoothed virtual camera (that is, the first virtual camera described above) is determined in response to a real-time switching operation on an original virtual camera. An attitude angle smoothing module is invoked to smooth a camera parameter of the to-be-smoothed virtual camera to obtain a smoothed attitude angle.

In some embodiments, an original virtual camera in a virtual scene may be a virtual camera selected by a user. The original virtual camera may be a virtual camera having a binding relationship with a physical camera, or a virtual camera having no binding relationship with a physical camera.

As an example, FIG. 5 is a schematic diagram of a parameter processing method for a virtual camera according to some embodiments. An original virtual camera in a virtual scene includes a virtual camera 2, a virtual camera 3, and a virtual camera 4. The virtual camera 2 may be a virtual camera bound to a physical camera 1. The physical camera 1 is a camera existing in the real world. The virtual camera 3 may be a virtual camera pointing to the virtual camera 2. The virtual camera 4 may be an arbitrary virtual camera selected based on a selection operation. The virtual camera 3 and the virtual camera 4 do not have a binding relationship with the physical camera 1.

In some embodiments, in response to a real-time switching operation on an original virtual camera, a to-be-smoothed virtual camera is determined. In a case that the to-be-smoothed virtual camera is a virtual camera bound to a physical camera (that is, the first virtual camera described above), coordinates of three-dimensional joints 46 in a world coordinate system are determined based on a virtual-real fusion object module 42. A spatial position 44 of the virtual camera bound to the physical camera is determined based on a virtual-real fusion camera module 43. An attitude angle 47 of the virtual camera bound to the physical camera is determined based on the coordinates of the three-dimensional joints and a location of the virtual camera bound to the physical camera. An attitude angle smoothing module is invoked to smooth the attitude angle 47 of the virtual camera bound to the physical camera to obtain a smoothed attitude angle.

In some embodiments, the coordinates of the three-dimensional joints in the world coordinate system (that are, the joint coordinates described above) may obtain a weighted average by performing weighted averaging. The weighted average is used as a three-dimensional coordinate of an object in a virtual world.

In some embodiments, that an attitude angle of the virtual camera bound to the physical camera is determined based on the coordinates of the three-dimensional joints and a location of the virtual camera bound to the physical camera may be implemented in the following manner: determining a target vector by starting with the location of the virtual camera bound to the physical camera and ending with the three-dimensional coordinate of the object in the virtual world; and determining the attitude angle of the virtual camera bound to the physical camera based on the target vector. An expression for the target vector may be:

$$v=(x,y,z) \tag{15}$$

v represents the target vector. x represents a component of the target vector in a horizontal axis direction of the world coordinate system. y represents a component of the target vector in a longitudinal axis direction of the world coordinate system. z represents a component of the target vector in a vertical axis direction of the world coordinate system.

The attitude angle of the virtual camera bound to the physical camera includes a roll angle, a pitch angle, and a heading angle. Expressions for the attitude angle respectively are:

$$G1=0 \tag{16}$$

$$G2=a \sin(z) \tag{17}$$

$$G3=a \tan 2(y,x) \tag{18}$$

G1 represents the roll angle. G2 represents the pitch angle. G3 represents the heading angle.

In some embodiments, in the attitude angle smoothing module, the attitude angle may be smoothed in the following manner: invoking a filter to smooth the attitude angle to obtain the smoothed attitude angle.

An expression for smoothing may be:

$$\alpha_n=(1-k_1)\alpha_{n-1}+k_1\beta_n \tag{19}$$

$\alpha_n$ represents a smoothed attitude angle at an $n^{th}$ moment. $\alpha_{n-1}$ represents a smoothed attitude angle at an $(n-1)^{th}$ moment. $\beta_n$ represents a to-be-smoothed attitude angle at the $n^{th}$ moment. $k_1$ represents an attitude angle smoothing index, and $k_1 \in [0,1]$. The attitude angle smoothing index represents smoothness of the attitude angle.

In some embodiments, in response to the real-time switching operation on the original virtual camera, the to-be-smoothed virtual camera is determined. In a case that the to-be-smoothed virtual camera is a virtual camera 49 (that is, the third virtual camera described above) that sets the attitude angle by mouse and touch operations 48, the set attitude angle is obtained, and the attitude angle smoothing module is invoked to smooth the obtained attitude angle to obtain the smoothed attitude angle.

In some embodiments, in response to the real-time switching operation on the original virtual camera, the to-be-smoothed virtual camera is determined. In a case that the to-be-smoothed virtual camera is a virtual camera pointing to a direction of the virtual camera bound to the physical camera, an attitude angle 45 of the virtual camera pointing to the direction of the virtual camera bound to the physical camera is obtained, and the attitude angle smoothing module is invoked to smooth the attitude angle 45 to obtain the smoothed attitude angle.

The following describes a processing process of the attitude angle smoothing module performing smoothing according to some embodiments. Whether the attitude angle is an attitude angle of a quaternion type is determined. In a case that the attitude angle is the attitude angle of the quaternion type, the attitude angle of the quaternion type is smoothed element by element to obtain a smoothed attitude angle of the quaternion type. The smoothed attitude angle of the quaternion type is converted into an Euler angle type. In a case that the attitude angle is an attitude angle of the Euler angle type, the attitude angle of the Euler angle type is smoothed element by element to obtain a smoothed attitude angle of the Euler angle type.

Figures 13, 14:
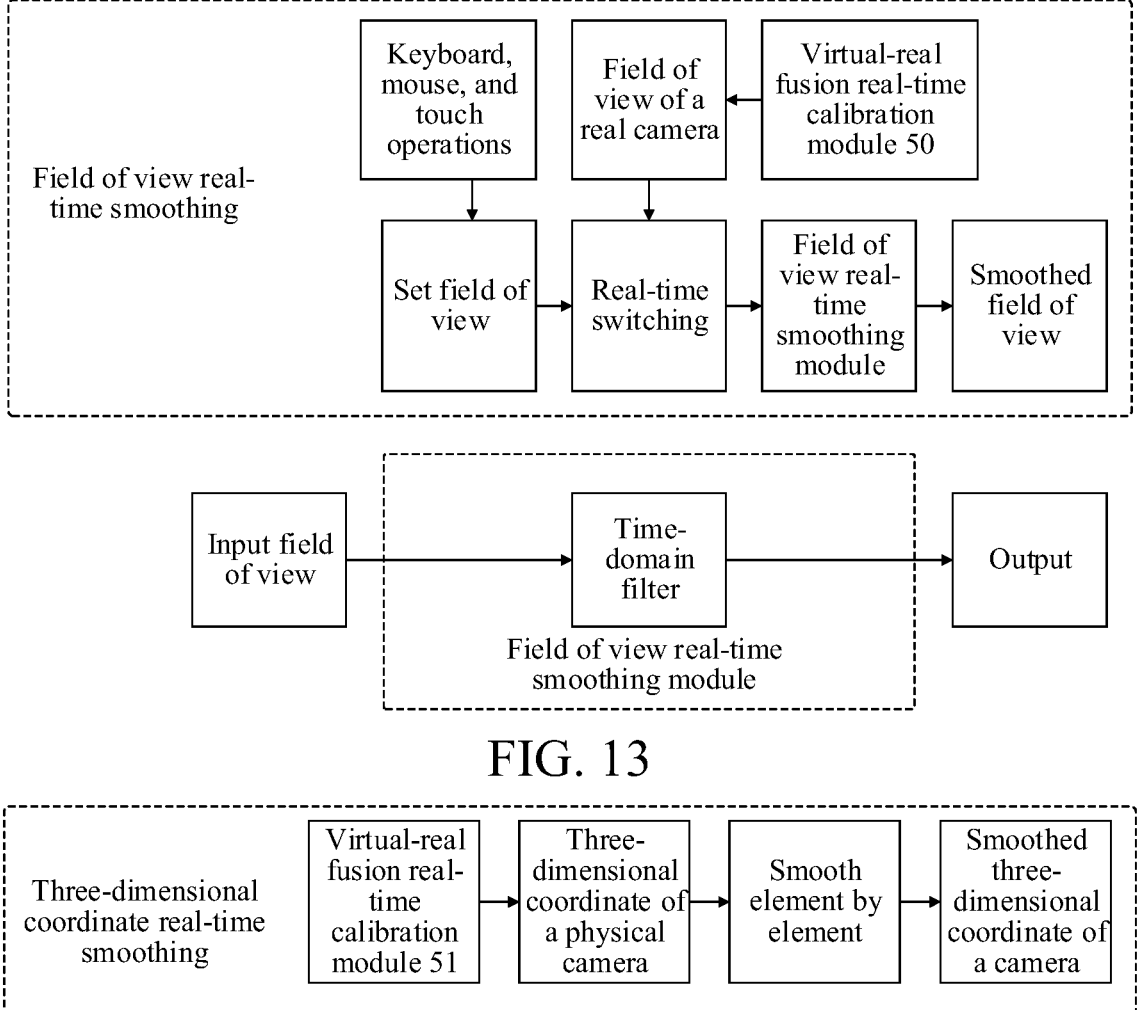
FIG. 13 are schematic diagrams of a parameter processing method for a virtual camera according to some embodiments FIG. 14 are schematic diagrams of a parameter processing method for a virtual camera according to some embodiments

Then, the smoothing on the field of view is described. FIG. 13 is a schematic diagram of a parameter processing method for a virtual camera according to according to some embodiments. In response to a real-time switching operation on an original virtual camera, a to-be-smoothed virtual camera is determined. In a case that the to-be-smoothed virtual camera is a virtual camera bound to a physical camera, a field of view of the virtual camera bound to the physical camera is determined based on a virtual-real fusion real-time calibration module 50. In a case that the to-be-smoothed virtual camera is not a virtual camera bound to the physical camera, the field of view set by mouse and touch operations is obtained. A field of view real-time smoothing module is invoked to smooth the field of view to obtain a smoothed field of view.

The following describes a processing process of the field of view real-time smoothing module performing smoothing according to some embodiments. A time-domain filter is invoked to smooth an input field of view to obtain output of the field of view real-time smoothing module.

In some embodiments, in the field of view real-time smoothing module, the field of view may be smoothed in the following manner: invoking a time-domain filter to smooth an input field of view to obtain output of the field of view real-time smoothing module.

An expression for smoothing may be:

$$\theta_n=(1-k_2)\theta_{n-1}+k_2\varepsilon_n \tag{20}$$

$\theta_n$ represents a smoothed field of view at an $n^{th}$ moment. $\theta_{n-1}$ represents a smoothed field of view at an $(n-1)^{th}$ moment. $\varepsilon_n$ represents a to-be-smoothed field of view at the $n^{th}$ moment. $k_2$ represents a field of view smoothing index, and $k_2 \in [0,1]$. The field of view smoothing index represents smoothness of the field of view.

The smoothing on the three-dimensional coordinate is described finally. FIG. 14 is a schematic diagram of a parameter processing method for a virtual camera according to some embodiments. In some embodiments, in response to a real-time switching operation on an original virtual camera, a to-be-smoothed virtual camera is determined. In a case that a to-be-smoothed virtual camera is a virtual camera bound to a physical camera, a three-dimensional coordinate of the virtual camera bound to the physical camera is determined based on a virtual-real fusion real-time calibration module 51. The three-dimensional coordinate is smoothed element by element to obtain a smoothed three-dimensional coordinate of a camera.

In some embodiments, an expression for smoothing element by element may be:

$$\tau_n = (1-k_3)\tau_{n-1} + k_3 \omega_n \qquad (21)$$

$\tau_n$ represents a smoothed three-dimensional coordinate of a camera at an $n^{th}$ moment. $\tau_{n-1}$ represents a smoothed three-dimensional coordinate of the camera at an $(n-1)^{th}$ moment. $\omega_n$ represents a to-be-smoothed three-dimensional coordinate of the camera at the $n^{th}$ moment. $k_3$ represents a three-dimensional coordinate smoothing index, and $k_3 \in [0, 1]$. The three-dimensional coordinate smoothing index represents smoothness of the three-dimensional coordinate.

In some embodiments, an effect of camera shaking caused by earthquakes and handheld camera shaking can be simulated by adding jitters of an attitude angle to a camera of a virtual stabilizer (using an anti-jitter feature in reverse) to improve quality of camera movement.

In some embodiments, smoothing is not limited to a first-order filter (IIR). Filters with other orders, Kalman filters, or the like can implement smoothing.

In some embodiments, for the virtual camera not bound to the physical camera, a field of view can be automatically set based on a size of a virtual object projected onto an imaging surface of the virtual camera, to implement automatic pushing, pulling, swinging, and moving of the virtual camera.

It may be understood that in some embodiments, related data such as the camera parameter is involved. In a case that some embodiments are applied to specific products or technologies, permission or consent of users is required. Moreover, collection, use, and processing of the related data need to comply with related laws, regulations, and standards of related countries and regions.

The following continues to describe an exemplary structure that an implementation of the parameter processing apparatus 455 for a virtual camera provided some embodiments is the software module. In some embodiments, as shown in FIG. 3, the software module in the parameter processing apparatus 455 for a virtual camera stored in the memory 450 may include: the obtaining module 4551, configured to obtain a camera parameter of a first virtual camera, the first virtual camera having a binding relationship with a physical camera in a real scene, and the physical camera being used for image data acquisition of an object in the real scene to obtain image data of the object; the smoothing module 4552, configured to smooth the camera parameter of the first virtual camera to obtain a target camera parameter; the configuration module 4553, configured to configure a second virtual camera in a virtual scene; and the adjustment module 4554, configured to adjust a camera parameter of the second virtual camera in the virtual scene based on the target camera parameter to obtain the adjusted second virtual camera, a focus of the second virtual camera corresponding to a focus of the first virtual camera, and the adjusted second virtual camera being configured to render based on the image data to obtain an image of the virtual scene including the object.

In some embodiments, in a case that a camera parameter includes an attitude angle, the obtaining module 4551 is further configured to obtain a target location of the object in a world coordinate system and a location of the first virtual camera; determine a target direction vector based on the target location of the object in the world coordinate system and the location of the first virtual camera, the target direction vector being used for indicating, in the world coordinate system, a direction of the first virtual camera pointing to the object; and determine the attitude angle of the first virtual camera based on the target direction vector.

In some embodiments, the attitude angle includes a pitch angle and a heading angle. The obtaining module 4551 is further configured to determine a cosine value of a vertical axis component of the target direction vector as the pitch angle of the first virtual camera, the vertical axis component being a component of the target direction vector on a vertical axis of the world coordinate system; determine a ratio of the longitudinal axis component and the horizontal axis component of the target direction vector as a reference ratio, the longitudinal axis component being a component of the target direction vector on a longitudinal axis of the world coordinate system, and the horizontal axis component being a component of the target direction vector on a horizontal axis of the world coordinate system; and determine a tangent value of the reference ratio value as the heading angle of the first virtual camera.

In some embodiments, in a case that there is one object, the obtaining module 4551 is further configured to obtain a plurality of joint coordinates of the object in the world coordinate system; perform a weighted summation on the plurality of joint coordinates to obtain the target location of the object in the world coordinate system.

In some embodiments, in a case that there are at least two objects, the obtaining module 4551 is further configured to perform the following processing respectively for each object: obtaining a plurality of joint coordinates of the object in the world coordinate system; performing a weighted summation on the plurality of joint coordinates to obtain a location of the object in the world coordinate system; and determining the target location based on the location of each object in the world coordinate system, a distance between the target location and the location of each object in the world coordinate system being less than a distance threshold.

In some embodiments, the first virtual camera has n smoothing moments. n is a positive integer greater than 1. The smoothing module 4552 is further configured to obtain a smoothing index and an $(n-1)^{th}$ target camera parameter in a case that the camera parameter of the first virtual camera includes a camera parameter at an $n^{th}$ smoothing moment, the smoothing index being used for indicating smoothness of the camera parameter, and the $(n-1)^{th}$ target camera parameter is a target camera parameter obtained by smoothing, at an $(n-1)^{th}$ smoothing moment, the camera parameter of the first virtual camera; and smooth the camera parameter at the $n^{th}$ smoothing moment based on the smoothing index and the $(n-1)^{th}$ target camera parameter to obtain an $n^{th}$ target camera parameter, and use the $n^{th}$ target camera parameter as the target camera parameter.

In some embodiments, the smoothing index is between 0 and 1, and the smoothing module 4552 is further configured to determine a product of the camera parameter at the $n^{th}$ smoothing moment and the smoothing index as a first reference parameter; determine a product of the $(n-1)^{th}$ target camera parameter and a supplementary smoothing index as a second reference parameter, the supplementary smoothing index being a difference between the smoothing index and 1; and add the first reference parameter and the second reference parameter to obtain the $n^{th}$ target camera parameter, and use the $n^{th}$ target camera parameter as the target camera parameter.

In some embodiments, in a case that the camera parameter includes an attitude angle, the attitude angle includes a pitch angle, a heading angle, and a roll angle. The parameter processing apparatus for a virtual camera further includes: a locking module, configured to lock a target angle in response to a lock instruction for the target angle in the attitude angle, the target angle including at least one of the pitch angle, the heading angle, and the roll angle; and the smoothing module, further configured to smooth a part of the attitude angle except the target angle to obtain the target camera parameter.

In some embodiments, the adjustment module 4554 is further configured to adjust a current camera parameter of the second virtual camera in the virtual scene to the target camera parameter to obtain the adjusted second virtual camera. The parameter processing apparatus for a virtual camera further includes: an instruction adjustment module, configured to adjust the target camera parameter in response to an adjustment instruction for the target camera parameter to obtain the adjusted second virtual camera.

In some embodiments, in a case that the camera parameter includes the attitude angle, the smoothing module 4552 is further configured to obtain a data type of the attitude angle, the data type including a quaternion type and an Euler angle type; smooth each element in the attitude angle of the quaternion type in a case that the data type is the quaternion type to obtain a reference attitude angle of the quaternion type; and convert a data type of the reference attitude angle of the quaternion type to obtain a reference attitude angle of the Euler angle type, and determine the reference attitude angle of the Euler angle type as a target attitude angle.

In some embodiments, the parameter processing apparatus for a virtual camera further includes: a selection module, configured to determine a plurality of configured virtual cameras in the virtual scene, each configured virtual camera being respectively bound to different physical cameras; and determine a selected virtual camera as the first virtual camera in response to a selection operation on the plurality of configured virtual cameras.

In some embodiments, the parameter processing apparatus for a virtual camera further includes: a second obtaining module, configured to obtain a camera parameter of a third virtual camera, the third virtual camera having no binding relationship with the physical camera in the real scene; a second smoothing module, configured to smooth the camera parameter of the third virtual camera to obtain a target camera parameter of the third virtual camera; a second configuration module, configured to configure a fourth virtual camera in the virtual scene, a focus of the fourth virtual camera corresponding to a focus of the third virtual camera; and a second adjustment module, configured to adjust a camera parameter of the fourth virtual camera based on the target camera parameter of the third virtual camera to obtain the adjusted fourth virtual camera, the adjusted fourth virtual camera being configured to render to obtain an image of the virtual scene.

In some embodiments, in a case that the camera parameter of the third virtual camera includes an attitude angle, the second obtaining module is further configured to obtain a location parameter of a focus location of the third virtual camera; determine a direction vector of the third virtual camera based on the location parameter of the focus location and a location parameter of the third virtual camera; and determine the attitude angle of the third virtual camera based on the direction vector of the third virtual camera.

In some embodiments, in a case that the camera parameter includes a field of view, the second obtaining module is further configured to obtain a virtual distance in a case that a virtual object exists within a field of view range of the third virtual camera, the virtual distance being a distance between a first location and a second location, the first location being a location of the third virtual camera in the world coordinate system, and the second location being a location of the virtual object in the world coordinate system; and determine the field of view of the third virtual camera based on the virtual distance, a value of the virtual distance being proportional to a value of the field of view.

In some embodiments, the parameter processing apparatus for a virtual camera further includes: a jitter module, configured to add a jitter parameter to a camera parameter of the adjusted fourth virtual camera in response to a jitter parameter adding instruction for the adjusted fourth virtual camera, to enable an image rendered by the fourth virtual camera with the added jitter parameter to produce a shaking effect.

A person skilled in the art would understand that the above "modules" could be implemented by hardware logic, a processor or processors executing computer software code, or a combination of both. The "modules" may also be implemented in software stored in a memory of a computer or a non-transitory computer-readable medium, where the instructions of each module are executable by a processor to thereby cause the processor to perform the respective operations of the corresponding module Some embodiments provide a computer program product. The computer program product includes a computer program and computer-executable instructions. The computer program and the computer-executable instructions are stored in a computer-readable storage medium. A processor of an electronic device reads the computer-executable instructions from the computer-readable storage medium. The processor executes the computer-executable instructions to enable the electronic device to perform the parameter processing method for a virtual camera according to some embodiments.

Some embodiments provide a computer-readable storage medium having computer-executable instructions stored thereon. The computer-executable instructions, when being executed by a processor, enable the processor to perform the parameter processing method for a virtual camera according to some embodiments, for example, the parameter processing method for a virtual camera shown in FIG. 4.

In some embodiments, the computer-readable storage medium may be a read-only memory (ROM), a random access memory (RAM), an erasable programmable read-only memory (EPROM), an electrically erasable programmable read-only memory (EEPROM), a flash memory, a magnetic surface memory, an optical disc, a CD-ROM, or the like, or may be various electronic devices including one of the foregoing memories or any combination.

In some embodiments, the computer-executable instructions may be in a form of programs, software, software modules, scripts, or code, written in any form of programming language (which includes compiled or interpreted languages, or declarative or procedural languages), and may be deployed in any form, including being deployed as a standalone program or as a module, component, subroutine, or another unit suitable for use in a computing environment.

In some embodiments, the computer-executable instructions may, but do not necessarily, correspond to files in a file system, and may be stored in a part of the file for saving other programs or data, for example, stored in one or more scripts in a hyper text markup language (HTML) document, in a single file specifically used for the program of interest, or in a plurality of collaborative files (for example, files storing one or more modules, a submodule, or a code part).

In some embodiments, the computer-executable instructions may be deployed to execute on a single electronic device, or deployed on a plurality of electronic devices located in a single location, or deployed on a plurality of electronic devices distributed in a plurality of locations and interconnected through a communication network.

In conclusion, various embodiments have the following beneficial effects:

(1) A camera parameter of a first virtual camera bound to a physical camera is obtained, and the camera parameter of the first virtual camera is smoothed to obtain a target camera parameter. A camera parameter of a second virtual camera is adjusted based on the target camera parameter to obtain the adjusted second virtual camera. Image data acquired by the physical camera is rendered by the adjusted second virtual camera to obtain an image of a virtual scene including an object. During image rendering of virtual-real fusion, because the first virtual camera has a binding relationship with the physical camera in a real scene, the first virtual camera and the physical camera have a same camera parameter, and then smoothing on the camera parameter of the first virtual camera is equivalent to smoothing on the camera parameter of the physical camera. In addition, the second virtual camera corresponding to a focus of the first virtual camera is configured to transfer the target camera parameter obtained by smoothing to the second virtual camera. In this way, the physical camera in the real scene does not need assistance of a hardware stabilizer, and even if the physical camera jitters, the camera parameter of the second virtual camera can remain stable. This effectively improves stability performance of the virtual camera, and reduces hardware costs of installing a hardware stabilizer on the physical camera, thereby significantly reducing the hardware costs.

(2) Virtual cameras bound to real cameras are configured in the virtual scene, and the bound virtual cameras are used as configured virtual cameras. A selected virtual camera is determined as the first virtual camera in response to a selection operation on the plurality of configured virtual cameras, to determine a camera parameter of a to-be-smoothed virtual camera based on the selection. In a case of a large amount of configuration of physical cameras, an amount of configuration of virtual cameras bound to the physical cameras also increases sharply. A to-be-smoothed object is determined based on the selection operation on the configured virtual cameras, so that camera parameters of each virtual camera do not need to be smoothed. Instead, the virtual camera is selected selectively. The camera parameter of the selected virtual camera is smoothed, thereby effectively reducing a quantity of virtual cameras with camera parameters to be smoothed, effectively reducing an amount of calculation, and improving smoothing efficiency.

(3) A target location of the object in a world coordinate system is obtained by performing a weighted summation on the plurality of joint coordinates, so that the target location of the object in the world coordinate system is accurately determined, and an attitude angle of the first virtual camera is determined based on the target location subsequently, thereby effectively improving accuracy of the determined attitude angle of the first virtual camera.

(4) In a case that there are at least two objects, the location of each object in the world coordinate system may be determined respectively, and a location where a distance between the location of each object in the world coordinate system is less than a distance threshold is determined as the target location, to accurately determine the target location, and the attitude angle of the first virtual camera is determined based on the target location subsequently, thereby effectively improving accuracy of the determined attitude angle of the first virtual camera.

(5) A pitch angle and a heading angle of the first virtual camera are accurately determined based on a target direction vector, so that smoothing can be carried out based on the accurate pitch angle and heading angle subsequently, thereby effectively improving accuracy of determining the pitch angle and the heading angle.

(6) Each of n smoothing moments of the first virtual camera is smoothed to smooth the camera parameter at each smoothing moment of the first virtual camera, so that a gap between the camera parameters at any two adjacent smoothing moments does not change, thereby implementing smoothing for the camera parameter.

(7) A part of the attitude angle except a target angle is smoothed to gradually smooth or partially smooth different attitude angles, thereby ensuring controllability of smoothing for the attitude angle and satisfying smoothing requirements in various application scenarios. In addition, progressive smoothing can be implemented, and an error rate in a smoothing process is reduced, thereby improving accuracy of the smoothing.

(8) Based on a data type of the attitude angle, different types of attitude angle are transformed and smoothed, thereby effectively improving universality of smoothing for the attitude angle.

(9) The second virtual camera of which a distance from the focus of the first virtual camera is less than the focus distance threshold is configured in the virtual scene, so that the second virtual camera always tracks a photographing direction of the first virtual camera to photograph, and the second virtual camera having a same photographing function and a same perspective relation with the first virtual camera is configured in the virtual scene, to replace the first virtual camera to render based on image data, to obtain an image of a virtual scene including an object.

(10) The pitch angle and the heading angle of a third virtual camera are accurately determined based on the direction vector of the third virtual camera, so that smoothing can be easily carried out based on the accurate pitch angle and heading angle subsequently, thereby effectively improving accuracy of the pitch angle and the heading angle.

(11) A field of view of the third virtual camera is dynamically controlled based on the value of the virtual distance, so that the field of view of the third virtual camera changes correspondingly with a change of the value of the virtual distance. Therefore, dynamic control of the field of view of the third virtual camera is implemented, and automatic pushing, pulling, swinging, and moving of the field of view of the third virtual camera is implemented, thereby effectively improving a camera movement effect of the third virtual camera.

(12) A jitter parameter is added to the camera parameter of an adjusted fourth virtual camera, so that reverse application of anti-jitter processing is implemented, and the image rendered by the fourth virtual camera can produce a shaking effect, to imitate an earthquake effect in a real scene, so that an image rendered by the adjusted fourth virtual camera is realistic.

(13) The fourth virtual camera of which a distance from a focus of the third virtual camera is less than the focus distance threshold is configured in the virtual scene, so that the fourth virtual camera always tracks a photographing direction of the third virtual camera to photograph, and the fourth virtual camera having a same photographing function and a same perspective relation with the third virtual camera is configured in the virtual scene, to replace the third virtual camera to render based on image data, to obtain an image of a virtual scene including an object.

(14) An effect of camera shaking caused by earthquakes and handheld camera shaking is simulated by adding jitters of the attitude angle to a camera of a virtual stabilizer (using an anti-jitter feature in reverse) to improve quality of camera movement.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A parameter processing method for a virtual camera, performed by an electronic device, comprising:
   obtaining a camera parameter of a first virtual camera in a virtual scene, the first virtual camera having a binding relationship with a physical camera in a real scene and the physical camera being configured to obtain image data of an object in the real scene;
   smoothing the camera parameter of the first virtual camera to obtain a target camera parameter; and
   configuring a second virtual camera in the virtual scene and adjusting a camera parameter of the second virtual camera based on the target camera parameter to obtain an adjusted second virtual camera, a focus of the second virtual camera corresponding to a focus of the first virtual camera,
   wherein the adjusted second virtual camera is configured for rendering based on the image data to obtain an image of the virtual scene comprising the object.

2. The parameter processing method according to claim 1, wherein based on the camera parameter comprising an attitude angle, obtaining the camera parameter of the first virtual camera in the virtual scene comprises:
   obtaining a target location of the object in a world coordinate system and a location of the first virtual camera in the virtual scene;
   determining a target direction vector based on the target location of the object in the world coordinate system and the location of the first virtual camera, the target direction vector indicating, in the world coordinate system, a direction of the first virtual camera pointing to the object; and
   determining the attitude angle of the first virtual camera based on the target direction vector.

3. The parameter processing method according to claim 2, wherein the attitude angle comprises a pitch angle and a heading angle; and wherein determining the attitude angle of the first virtual camera based on the target direction vector comprises:
   determining a cosine value of a vertical axis component of the target direction vector as the pitch angle of the first virtual camera, the vertical axis component being a component of the target direction vector on a vertical axis of the world coordinate system;
   determining a ratio of a longitudinal axis component and a horizontal axis component of the target direction vector as a reference ratio, the longitudinal axis component being a component of the target direction vector on a longitudinal axis of the world coordinate system, and the horizontal axis component being a component of the target direction vector on a horizontal axis of the world coordinate system; and
   determining a tangent value of the reference ratio value as the heading angle of the first virtual camera.

4. The parameter processing method according to claim 2, wherein based on there being one object, obtaining the target location of the object in the world coordinate system comprises:
   obtaining a plurality of joint coordinates of the object in the world coordinate system; and
   performing a weighted summation on the plurality of joint coordinates to obtain the target location of the object in the world coordinate system.

5. The parameter processing method according to claim 2, wherein based on there being at least two objects, obtaining the target location of the object in the world coordinate system comprises:
   performing the following processing respectively for each object: obtaining a plurality of joint coordinates of the object in the world coordinate system; performing a weighted summation on the plurality of joint coordinates to obtain a location of the object in the world coordinate system; and
   determining the target location based on the location of each object in the world coordinate system, a distance between the target location and the location of each object in the world coordinate system being less than a distance threshold.

6. The parameter processing method according to claim 2, wherein based on the camera parameter comprising the attitude angle, the attitude angle comprises a pitch angle, a heading angle, and a roll angle; and
   before smoothing the camera parameter of the first virtual camera to obtain the target camera parameter, the parameter processing method further comprises:
   locking a target angle based on a lock instruction for the target angle in the attitude angle, the target angle comprising at least one of the pitch angle, the heading angle, and the roll angle; and
   wherein smoothing the camera parameter of the first virtual camera to obtain the target camera parameter comprises:
   smoothing a part of the attitude angle except the target angle to obtain the target camera parameter.

7. The parameter processing method according to claim 1, wherein the first virtual camera has n smoothing moments, n being a positive integer greater than 1; and
   wherein smoothing the camera parameter of the first virtual camera to obtain the target camera parameter comprises:
   obtaining a smoothing index and an $(n-1)^{th}$ target camera parameter based on the camera parameter of the first virtual camera comprising a camera parameter at an $n^{th}$ smoothing moment, the smoothing index indicating smoothness of the camera parameter and the $(n-1)^{th}$ target camera parameter being a target camera parameter obtained by smoothing, at an $(n-1)^{th}$ smoothing moment, the camera parameter of the first virtual camera; and smoothing the camera parameter at the $n^{th}$ smoothing moment based on the smoothing index and the $(n-1)^{th}$ target camera parameter to obtain an $n^{th}$ target camera parameter, and using the $n^{th}$ target camera parameter as the target camera parameter.

8. The parameter processing method according to claim 7, wherein the smoothing index is between 0 and 1, and wherein smoothing the camera parameter at the $n^{th}$ smoothing moment based on the smoothing index and the $(n-1)^{th}$ target camera parameter comprises:

determining a product of the camera parameter at the $n^{th}$ smoothing moment and the smoothing index as a first reference parameter;

determining a product of the $(n-1)^{th}$ target camera parameter and a supplementary smoothing index as a second reference parameter, the supplementary smoothing index being a difference between the smoothing index and 1; and adding the first reference parameter and the second reference parameter to obtain the $n^{th}$ target camera parameter, and using the $n^{th}$ target camera parameter as the target camera parameter.

9. The parameter processing method according to claim 1, wherein configuring the second virtual camera in the virtual scene and adjusting the camera parameter of the second virtual camera based on the target camera parameter to obtain the adjusted second virtual camera comprises:

adjusting a current camera parameter of the second virtual camera in the virtual scene to the target camera parameter to obtain the adjusted second virtual camera; and after adjusting the current camera parameter of the second virtual camera to the target camera parameter, the parameter processing method further comprises:

adjusting the target camera parameter based on an adjustment instruction for the target camera parameter to obtain the adjusted second virtual camera.

10. The parameter processing method according to claim 1, wherein based on the camera parameter comprising an attitude angle, smoothing the camera parameter of the first virtual camera to obtain the target camera parameter comprises:

obtaining a data type of the attitude angle, the data type comprising a quaternion type and an Euler angle type;

smoothing each element in the attitude angle of the quaternion type based on the data type of the attitude angle being the quaternion type to obtain a reference attitude angle of the quaternion type; and converting the data type of the reference attitude angle of the quaternion type to obtain a reference attitude angle of the Euler angle type, and determining the reference attitude angle of the Euler angle type as a target attitude angle.

11. The parameter processing method according to claim 1, wherein before obtaining the camera parameter of the first virtual camera in the virtual scene, the parameter processing method further comprises:

determining a plurality of configured virtual cameras in the virtual scene, each configured virtual camera being respectively bound to different physical cameras; and determining a selected virtual camera as the first virtual camera based on a selection operation on the plurality of configured virtual cameras.

12. The parameter processing method according to claim 1, wherein the parameter processing method further comprises:

obtaining a camera parameter of a third virtual camera, the third virtual camera having no binding relationship with the physical camera in the real scene;

smoothing the camera parameter of the third virtual camera to obtain a target camera parameter of the third virtual camera;

configuring a fourth virtual camera in the virtual scene, a focus of the fourth virtual camera corresponding to a focus of the third virtual camera; and adjusting a camera parameter of the fourth virtual camera based on the target camera parameter of the third virtual camera to obtain the adjusted fourth virtual camera, the adjusted fourth virtual camera being configured for rendering to obtain an image of the virtual scene.

13. The parameter processing method according to claim 12, wherein based om the camera parameter of the third virtual camera comprising an attitude angle, obtaining the camera parameter of the third virtual camera comprises:

obtaining a location parameter of a focus location of the third virtual camera;

determining a direction vector of the third virtual camera based on the location parameter of the focus location and a location parameter of the third virtual camera; and determining the attitude angle of the third virtual camera based on the direction vector of the third virtual camera.

14. The parameter processing method according to claim 12, wherein based on the camera parameter comprising a field of view, obtaining the camera parameter of the third virtual camera comprises:

obtaining a virtual distance in a case that a virtual object exists within a field of view range of the third virtual camera, the virtual distance being a distance between a first location and a second location, the first location being a location of the third virtual camera in a world coordinate system, and the second location being a location of the virtual object in the world coordinate system; and determining the field of view of the third virtual camera based on the virtual distance, a value of the virtual distance being proportional to a value of the field of view.

15. The parameter processing method according to claim 12, the parameter processing method further comprises:

adding a jitter parameter to a camera parameter of the adjusted fourth virtual camera based on a jitter parameter adding instruction for the adjusted fourth virtual camera, to enable an image rendered by the fourth virtual camera with the added jitter parameter to produce a shaking effect.

16. A parameter processing apparatus for a virtual camera, comprising:

at least one memory configured to store program code; and at least one processor configured to read the program code and operate as instructed by the program code, the program code comprising:

obtaining code configured to cause at least one of the at least one processor to obtain a camera parameter of a first virtual camera in a virtual scene, the first virtual camera having a binding relationship with a physical camera in a real scene and the physical camera being configured to obtain image data of an object in the real scene;

smoothing code configured to cause at least one of the at least one processor to smooth the camera parameter of the first virtual camera to obtain a target camera parameter;

configuration code configured to cause at least one of the at least one processor to configure a second virtual camera in the virtual scene; and adjustment code configured to cause at least one of the at least one processor to adjust a camera parameter of the second virtual camera in the virtual scene based on the target camera parameter to obtain the adjusted second virtual camera, a focus of the second virtual camera corresponding to a focus of the first virtual camera, wherein the adjusted second virtual camera is configured for rendering based on the image data to obtain an image of the virtual scene comprising the object.

17. The parameter processing apparatus according to claim 16, wherein based on the camera parameter comprising an attitude angle, the obtaining code causes at least one of the at least one processor to:

obtain a target location of the object in a world coordinate system and a location of the first virtual camera in the virtual scene;

determine a target direction vector based on the target location of the object in the world coordinate system and the location of the first virtual camera, the target direction vector indicating, in the world coordinate system, a direction of the first virtual camera pointing to the object; and determine the attitude angle of the first virtual camera based on the target direction vector.

18. The parameter processing apparatus according to claim 17, wherein the attitude angle comprises a pitch angle and a heading angle; and wherein the obtaining code is further configured to cause at least one of the at least one processor to:

determine a cosine value of a vertical axis component of the target direction vector as the pitch angle of the first virtual camera, the vertical axis component being a component of the target direction vector on a vertical axis of the world coordinate system;

determine a ratio of a longitudinal axis component and a horizontal axis component of the target direction vector as a reference ratio, the longitudinal axis component being a component of the target direction vector on a longitudinal axis of the world coordinate system, and the horizontal axis component being a component of the target direction vector on a horizontal axis of the world coordinate system; and determine a tangent value of the reference ratio value as the heading angle of the first virtual camera.

19. The parameter processing apparatus according to claim 17, wherein based on there being one object, the obtaining code causes at least one of the at least one processor to:

obtain a plurality of joint coordinates of the object in the world coordinate system; and perform a weighted summation on the plurality of joint coordinates to obtain the target location of the object in the world coordinate system.

20. A non-transitory computer-readable storage medium storing computer code which, when executed by at least one processor, causes the at least one processor to at least:

obtain a camera parameter of a first virtual camera in a virtual scene, the first virtual camera having a binding relationship with a physical camera in a real scene and the physical camera being configured to obtain image data of an object in the real scene;

smooth the camera parameter of the first virtual camera to obtain a target camera parameter; and configure a second virtual camera in the virtual scene and adjust a camera parameter of the second virtual camera based on the target camera parameter to obtain an adjusted second virtual camera, a focus of the second virtual camera corresponding to a focus of the first virtual camera, wherein the adjusted second virtual camera is configured for rendering based on the image data to obtain an image of the virtual scene comprising the object.

* * * * *